「(12) United States Patent
Norrman et al.

(10) Patent No.: US 9,350,537 B2
(45) Date of Patent: *May 24, 2016

(54) ENHANCED KEY MANAGEMENT FOR SRNS RELOCATION

(71) Applicant: Telefonaktiebolaget L M Ericsson (publ), Stockholm (SE)

(72) Inventors: Karl Norrman, Stockholm (SE); Tomas Hedberg, Stockholm (SE); Mats Naslund, Bromma (SE)

(73) Assignee: Telefonaktiebolaget LM Erricsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,861

(22) Filed: Nov. 18, 2014

(65) Prior Publication Data

US 2015/0140968 A1      May 21, 2015

Related U.S. Application Data

(63) Continuation of application No. 13/634,920, filed as application No. PCT/EP2011/053999 on Mar. 16, 2011, now Pat. No. 8,929,543.

(60) Provisional application No. 61/314,634, filed on Mar. 17, 2010.

(51) Int. Cl.
*H04L 29/06*      (2006.01)
*H04L 9/08*       (2006.01)
*H04W 12/04*      (2009.01)
(Continued)

(52) U.S. Cl.
CPC ................ *H04L 9/08* (2013.01); *H04W 12/04* (2013.01); *H04W 12/08* (2013.01); *H04W 36/0038* (2013.01); *H04W 36/12* (2013.01); *H04L 63/06* (2013.01)

(58) Field of Classification Search
CPC ............... H04L 9/08; H04L 9/30; H04L 9/22; H04L 9/18; H04L 9/06; H04L 63/06; H04W 12/08
USPC .......................................... 380/44
See application file for complete search history.

(56) References Cited

U.S. PATENT DOCUMENTS 6,405,313 B1 *  6/2002  Reiter ................ G06Q 20/3821
                                                                                         709/238
6,418,130 B1 *  7/2002  Cheng ..................... H04L 63/06
                                                                                         370/328

(Continued)

FOREIGN PATENT DOCUMENTS

WO        2006067561 A1      6/2006

*Primary Examiner* — Harunur Rashid
*Assistant Examiner* — Shahriar Zarrineh
(74) *Attorney, Agent, or Firm* — Rothwell, Figg, Ernst & Manbeck, P.C.

(57) ABSTRACT

A method that comprises maintaining, in a first node serving a mobile terminal over a connection protected by at least one first key, said first key and information about the key management capabilities of the mobile terminal. Upon relocation of the mobile terminal to a second node the method includes: if, and only if, said key management capabilities indicate an enhanced key management capability supported by the mobile terminal, modifying, by said first node, the first key, thereby creating a second key; sending, from the first node to the second node, the second key; and transmitting to the second node the information about the key management capabilities of the mobile terminal.

19 Claims, 14 Drawing Sheets

(51) Int. Cl.
   *H04W 36/00* (2009.01)
   *H04W 12/08* (2009.01)
   *H04W 36/12* (2009.01)

(56) References Cited

U.S. PATENT DOCUMENTS

| | | | |
|---|---|---|---|
| 7,065,340 B1* | 6/2006 | Einola | H04L 63/0428 380/270 |
| 7,127,251 B2 | 10/2006 | Laiho et al. | |
| 7,181,218 B2* | 2/2007 | Ovesjo et al. | 455/436 |
| 8,179,847 B2* | 5/2012 | Huber | G06Q 20/1235 370/329 |
| 8,862,878 B2* | 10/2014 | Bellwood | H04L 9/0836 713/168 |
| 2003/0084287 A1* | 5/2003 | Wang | H04L 63/08 713/168 |
| 2004/0062399 A1* | 4/2004 | Takase | H04L 63/062 380/277 |
| 2004/0117623 A1* | 6/2004 | Kalogridis | H04L 63/0807 713/165 |
| 2005/0111666 A1* | 5/2005 | Blom | H04L 63/0428 380/277 |
| 2006/0099929 A1* | 5/2006 | Frank | H04L 63/0428 455/411 |
| 2007/0091843 A1* | 4/2007 | Patel | H04L 63/0853 370/331 |
| 2007/0154016 A1* | 7/2007 | Nakhjiri | H04L 63/06 380/270 |
| 2007/0160201 A1* | 7/2007 | Blom | H04L 9/0844 380/30 |
| 2009/0041247 A1* | 2/2009 | Barany | H04L 63/06 380/270 |
| 2009/0207819 A1* | 8/2009 | Kroselberg | H04W 88/04 370/338 |
| 2009/0274302 A1* | 11/2009 | Wu | H04L 63/06 380/272 |
| 2009/0307496 A1* | 12/2009 | Hahn | H04L 63/0428 713/171 |
| 2010/0017595 A1* | 1/2010 | King | H04L 12/2838 713/151 |
| 2010/0220862 A1* | 9/2010 | Geary | H04W 12/04 380/272 |
| 2012/0216039 A1* | 8/2012 | Franklin | H04L 63/06 713/168 |

\* cited by examiner

ENHANCED KEY MANAGEMENT FOR SRNS RELOCATION

CROSS-REFERENCE TO RELATED APPLICATION(S)

This application is a continuation of application Ser. No. 13/634,920, filed on Sep. 14, 2012 (published as Pub. No.: US 2013/0003967), which is a 35 U.S.C. §371 National Phase Entry Application from PCT/EP11/53999, filed Mar. 16, 2011, designating the United States and claiming priority to application No. 61/314,634, filed on Mar. 17, 2010. The above identified applications and publications are incorporated by reference herein.

TECHNICAL FIELD

The invention relates to methods that allow a node to maintain information about the capabilities, for example key management capabilities of a corresponding node (for example a node serving a mobile terminal may maintain information about the key management capabilities of the mobile terminal). It also relates to a node having this capability.

BACKGROUND

It is known that wireless communications such as radio communications need to be secured by encryption owing to the relative ease with which wireless communication can be compromised. (The term "wireless" as used herein is intended to include any communication in which electromagnetic waves (rather than some form of wire) carry a signal over part or the entire communication path. Examples of the invention will be described with reference to radio communication, which uses radio-frequency electromagnetic waves to carry the communication and which is one example of wireless communication, but the invention is not limited to radio communication.) For this purpose, a wireless communication is usually secured using a cryptographic method based on one or more keys that are known to (or are "shared" by) the wireless network, or at least the originating and terminating terminals between which the wireless communication is being sent. In one known technique two keys, a "ciphering key" and an "integrity key", are used as basis for information/data confidentiality and integrity/authenticity.

In many cases, security is defined over a wireless link such as a radio link. In the case of communication between a mobile terminal (such as a mobile telephone) and a fixed base station, this means that the mobile terminal and the base station BS (or "access point" AP) are termination points for security, and thus need access to the key(s) used to secure the communication. However, distributing a key to multiple and easily accessible nodes poses a threat, as it increases the opportunities for an attacker to obtain a key.

This has not been a problem in WCDMA (Wideband Code Division Multiple Access, a standard used in 3G mobile telecommunication networks), since the security terminates in the Radio Network Controller (RNC) which sits in a relatively well protected site. However, in the LTE ("Long Term Evolution") mobile telecommunication standard, termination of radio link protection has been moved down to the base station (called "eNB" in LTE) which is much more exposed. In addition, new 3G evolution/HSPA (High Speed Packet Access) architectures allow the RNC functionality (or parts thereof, e.g. ciphering) to be moved to the base station (which is called "NodeB" in WCDMA). This means that it is necessary to protect the key(s) stored and used in the base station. One way of doing this is by improving the ways in which keys are managed.

The LTE standard includes a feature whereby the keys are changed at every intra-LTE handover. Thus, if "$K_{eNB}1$" denotes a key used to protect wireless traffic 4 between a mobile terminal (also referred to as Mobile Equipment (ME)) 1 and a first base station 2 (eNB1) in FIG. 1, then, after handover (or handoff) of the ME to a new base station 3 (eNB2), the new base station 3 will not use the original key $K_{eNB}1$ for communication with the ME 1. Instead, the new base station 3 will, after a handover, use a new key $K_{eNB}2$ that is derived from the original key $K_{eNB}1$, for example where $K_{eNB}2=f(K_{eNB}1, eNB2\_ID)$, where eNB2_ID is an identifier associated with the new base station 3. The application of a function f to a key will hereinafter be referred to as "tweaking" the key. The function f is a key derivation function, typically based on a suitable cryptographic function, e.g. a (presumed) one-way function or a pseudo-random function. If more than one key needs to be tweaked this can easily be accomplished by using a set of functions F, where $f_i$ is applied to obtain the $i^{th}$ key, for $f_i$ in F.

The key $K_{eNB}2$ is calculated by the first base station 2 and is transferred from the first base station 2 to the new base station 3 via a communication channel (e.g. the X2 interface) that connects the two base stations. Since the ME 1 is aware of the function f, the ME 1 can also derive the new key $K_{eNB}2$ by performing the same calculations locally (the ME only needs knowledge of $K_{eNB}1$ and the identity of eNB2, which are both available). Thus, after handover wireless communications 5 between the new base station 3 and the ME are protected using the new key $K_{eNB}2$ rather than using the original key $K_{eNB}1$.

This means that even if someone is able to extract the new key $K_{eNB}2$ from the new base station 3 then, provided the function f is correctly chosen, the original key $K_{eNB}1$ is still "safe" in the sense that it cannot be deduced from the information retrieved by extracting the key $K_{eNB}2$. Hence an intruder cannot record encrypted traffic between the first base station 2 and the mobile terminal 1, obtain the key after the ME has been handed over to the new base station 3 (which is assumed to be compromised) and then use the key to decipher traffic to/from the first base station 2.

It should be noted that in LTE there are also other mechanisms for changing keys at relocation (and in conjunction with certain state-changes of the ME). However, these mechanisms all require that the new key is generated by another network node, the so-called Mobility Management Entity (MME), and will therefore not be discussed further.

It will be understood that it is desirable that the computation of the new key $K_{eNB}2$ is done in the first base station 2, as otherwise the original key $K_{eNB}1$ would, at least temporarily, be exposed also in the new base station 3.

Current WCDMA networks have no possibility to change keys, except by running an authentication and key agreement (AKA) procedure which imposes signalling delays and induces load on the AuC/HLR (authentication centre/home location register), the RNC, the MSC (Mobile Switching Centre) and other nodes.

There is a current work item in 3GPP to study key management enhancements for UTRAN (TS 33.102, 3rd Generation Partnership Project; Technical Specification Group Services and System Aspects; 3G Security; Security architecture, http://www.3gpp.org/ftp/Specs/archive/33_series/33.0.102/33102-910.zip), i.e. for the WCDMA-based access network. It is within the scope to look at a solution to the problem of changing the keys at handover. However, as of now, little to no discussion on solutions has occurred and so far, the study has only discussed how to change the keys when they are transferred from the core network (VLR/MSC/SGSN) to the RNC, e.g., at initial attach or at Routing Area Update (RAU). This problem, of a "vertical" key change between a Core Network (CN) and a Radio Access Network (RAN) is a much simpler problem than the problem of a "horizontal" key change within a RAN, and has a solution that should be largely independent of a solution to the "horizontal" key change within a RAN. It has been acknowledged that it should be possible to change the keys also at SRNS relocation (i.e. when the ME changes its serving RNC), but exactly how that would be achieved is still open (see S3-100319, 3GPP TR 33.ukh V0.3.0 (2010-02).

Reviewing the different cases of mobility/handover defined in the existing 3GPP specifications there can be identified three cases of "horizontal" key derivations which need to be considered for any fully specified solution. These cases coincide with the mobility events that causes a change of RNC: SRNS (Serving Radio Network Subsystem) relocation without ME involvement (see 6.9.2.2.1 of TS 23.060, 3rd Generation Partnership Project; Technical Specification Group Services and System Aspects; General Packet Radio Service (GPRS); Service description; Stage 2, http://www.3gpp.org/ftp/Specs/archive/23_series/23.060/23060-930.zip), combined hard handover and SRNS relocation (see 6.9.2.2.2 of TS 23.060) and combined cell/URA update and SRNS relocation (see 6.9.2.2.3 of TS 23.060). In comparison, in the LTE standard the only case that exists is the one corresponding to combined hard handover and SRNS relocation. In other words, the existing LTE solution cannot be adopted in UTRAN in any straight-forward manner since it does not cover all cases. In addition the problem of interoperability with legacy terminals and network equipment does not exist in LTE since it was designed from the beginning to support the above-described key-change mechanism. The issues with introducing such a key-change mechanism in networks that are already deployed, but which do not have this functionality, will be apparent from the further discussion below.

When performing SRNS relocation without ME involvement, the network changes the serving RNC from the source RNC (the "source RNC" is the currently serving RNC) to the target RNC (which is a currently drifting RNC) even though the ME remains connected to the same base station (NodeB). This is illustrated in FIG. 2(a), which shows two RNCs 6a (or RNC1), 6b (or RNC2) connected to a core network 7. Each Base station is controlled by one RNC—FIG. 2(a) shows, as an example, two base stations, 8a (NodeB1) and 8b (NodeB2), controlled by RNC1 and one base station, 8c (NodeB3), controlled by RNC2. An ME 1 is served by one RNC, for example with RNC1, via a base station (NodeB1) before SRNS relocation. After SRNS relocation the ME is, as shown in broken lines, served by another RNC, for example with RNC2, via the same base station as before SRNS relocation. Only at the end of the SRNS relocation without ME involvement procedure, the target RNC (in this example RNC2 is the target RNC) informs the ME about the change of serving RNC. Hence, the ME is unaware of the change of RNC until it is completed, and this makes it difficult for the ME to determine which keys were used to protect certain messages (to be described in more detail later)—any solution adopted for UTRAN must overcome this problem.

In the combined hard handover with SRNS relocation case, the ME is informed by the source RNC that it shall change base station and at the same time it is to be served by a target RNC. This is illustrated in FIG. 2(b), which shows two RNCs connected to a core network. Before SRNS relocation an ME 1 is served by one RNC via a base station, for example with RNC1 via base station NodeB1. After SRNS relocation the ME is, as shown in broken lines, served by another RNC, for example RNC2, via a different base station (e.g., base station NodeB3) than before SRNS relocation.

In the combined cell/URA with SRNS relocation update case, the ME realises that it has moved into a new cell and sends an update message to the source RNC. This is illustrated in FIG. 2(c), which shows two RNCs connected to a core network. Note that FIG. 2(c) is identical to FIG. 2(b), but the signalling sequences differ. Before relocation an ME 1 is served by one RNC via a base station (for example is served by RNC1 via base station NodeB1). After relocation the ME 1 is, as shown in broken lines, served by another base station, which may be a base station served by the same RNC as the base station before relocation (eg NodeB2) or which may alternatively be a base station served by a different RNC to the base station before relocation (e.g., NodeB3 which is served by RNC2 and not with RNC1). The network decides if the update is acceptable and if so changes the serving RNC to the target RNC (if necessary) and the target RNC then informs the ME about the change of RNC. Again, the ME is informed of the change of RNC only at the end of the procedure.

During SRNS relocation, the source and target RNC communicate with each other via the core network to coordinate the relocation. In later versions of the UTRAN standard, there is also a procedure called enhanced SRNS relocation where the RNCs communicate directly with each other via the Iur interface as shown schematically in FIGS. 2(a) to 2(c).

The existing approaches for providing key tweaking, independently on the ME and the network sides, have a number of problems in the procedures discussed above. For example as mentioned, new 3G evolution/HSPA architectures allow the RNC to be collocated with the NodeB (possibly in the same hardware chassis). This implies that ciphering and integrity protection is performed in a location which is in the periphery of the network (possibly the radio equipment chassis is located in a hostile environment where hackers may physically attack it to get access to the ciphering keys). This makes it necessary to investigate enhanced protection of the keys used in HSPA. In particular, it would be beneficial to change keys when the RNC is changed at SRNS Relocation. Unlike the LTE standard however, the system was not designed from the outset to take the need to change keys at relocation into account. If a feature of changing keys at relocation is introduced, we need to provide for backwards compatibility when interworking with legacy equipment backwards compatibility with the existing signalling, changing as little as possible of the existing procedures.

It should be noted that neither WiMAX (IEEE 802.16) nor WLAN (IEEE 802.11) include a standardized way to change key at inter-BS/inter-AP handovers as an integral part of the handover procedure. Rather, the only possibility to change keys at handover for these radio access technologies is based on a performing a full (or in the WLAN case, the optimized 802.11r) authentication between the terminal (STA) and the target BS/AP. This is not acceptable in WCDMA as zero signalling overhead is desired (from key management point of view; there will of course be mobility signalling taking place).

SUMMARY

A first aspect of the invention provides a method comprising maintaining, in a first node serving a mobile terminal over a connection protected by at least one first key, said first key and information about key management capabilities of the mobile terminal. When the mobile terminal is relocated to a second node, if, and only if, said key management capabilities indicate an enhanced key management capability supported by the mobile terminal, the first node modifies the first key, thereby creating a second key which is sent from the first node to the second node. Information about the key management capabilities of the mobile terminal is transmitted to the second node.

The invention makes it possible for a node (in this case the first node) to maintain information about the key management capabilities of a corresponding node (in this case the mobile terminal). The nodes may, for example, be RNCs, eg the first node may be a source RNC which is updated and the second node may be a target RNC (which may or may not be updated). At relocation of the mobile terminal to a second node, the first node modifies the first key to create a second key if, and only if, the information maintained about the key management capabilities of the mobile terminal indicates that the mobile terminal supports an enhanced key management capability—otherwise, the first node does not modify the first key. Thus, if the first node knows, from the maintained information, that the mobile terminal is able to tweak the key(s), it is safe for the first node to tweak the key(s) at relocation since the second node and the mobile terminal will be able to communicate using the tweaked key(s) after relocation. The invention thus ensures that either (1) both the first node and the mobile terminal modify the first key or (2) neither the first node and the mobile terminal modify the first key, so that the key used at the network side after relocation will be the same as the key used at the mobile side after relocation. Moreover, information as to whether or not the mobile terminal is updated is sent to the target RNC so that the target RNC is made aware of whether the mobile terminal is updated (assuming the target RNC is updated; if the target RNC is not updated it will ignore the information received from the source RNC).

Where the connection is protected by two or more keys, it would in principle be possible for only some of the keys to be changed (tweaked), so that not all keys would be changed. In practice however it will usually be desirable to change all keys (when enhanced key management capabilities are supported) for greatest security.

Furthermore, transmitting information about the key management capabilities of the mobile terminal to the second node means that, when the second node subsequently hands the mobile terminal to a further node, the second node will be aware whether or not the mobile terminal is an updated mobile terminal that is able to tweak the key(s) at relocation. The second node thus knows whether it is able to tweak the key(s) upon the subsequent relocation of the mobile terminal (again assuming the target RNC (second node) is updated; if the target RNC is not updated it will as already stated ignore the information received from the source RNC).

The method may further comprise, prior to the first node modifying said first key, the first node instructing said mobile terminal to perform an intra-node relocation to said first node.

The information about the key management capabilities of the mobile terminal may be transmitted to the second node by the mobile terminal or the first node.

The information may be transmitted in one or more signalling messages relating to completion of the relocation. This allows the invention to be implemented without the need for any additional messages to be exchanged at relocation.

The first node may determine at a relocation preparation phase, based on the information, whether the enhanced key management capability is supported by the mobile terminal.

A relocation in general consists of two phases: a preparation phase and an execution phase. Both phases include some signalling between the source RNC and the target RNC. The relocation "preparation phase" may for example be as defined in 3GPP TS 25.331 for the cases SRNS Relocation with UE involvement, SRNS Relocation without UE involvement, and Combined Cell/URA Update and SRNS relocation. In this embodiment when the source RNC decides that it is time to relocate the terminal to the target RNC, the source RNC starts the preparation phase and can then determine if the mobile terminal supports enhanced key handling. After this, the source RNC may chose to complete the relocation by running also the execution phase.

Modifying the first key may comprise modifying the first key using the first key and optionally but preferably also using information relating to the second node.

The method may comprise, when the mobile terminal is handed over from a third node to the first node, the first node sending information about its key management capabilities to the mobile terminal.

This feature relates to the first node being a "target" node at an earlier relocation of the mobile terminal, ie a relocation to a target RNC which is updated (as the first node is assumed to be updated). At relocation, information that the target RNC (the first node) is an updated RNC is sent to the mobile terminal, so that the mobile terminal is made aware that it is being served after the relocation by an updated RNC (assuming the mobile terminal is updated; if the mobile terminal is not updated it will ignore the information received from the target RNC).

The method may further comprise receiving at the first node, after relocation of the mobile terminal from the third node to the first node, information from the mobile terminal about the key management capabilities of the mobile terminal. For example, if the mobile terminal is updated it informs the target RNC of this. The target RNC in this earlier relocation (ie the first node) stores any information it receives about the key management capabilities of the mobile terminal.

The information may be included and transmitted in one or more signalling messages relating to completion of the relocation of the mobile terminal from the third node to the first node, again avoiding the need for any additional messages (compared to existing systems/signalling schemes) to be exchanged at relocation.

The information about the key management capabilities of the first node sent by the first node to the mobile terminal may comprise information that the first node supports an enhanced key management capability.

A second aspect of the invention provides a method comprising: maintaining, in a mobile terminal served by a first node over a connection protected by at least one first key, the first key and, information about the key management capabilities of the first node. Upon relocation of the mobile terminal from the first node to a second node, the mobile terminal modifies the first key to create a second key if, and only if, the key management capabilities indicate that the first node supports an enhanced key management capability. The first node may, for example, be an RNC. The mobile terminal (which is updated), is aware whether or not the RNC serving the mobile terminal is updated and so will tweak the key(s) upon relocation to the target RNC (second node).

The method may further comprise, before the mobile terminal modifies the first key, the mobile terminal performing an intra-node relocation to said first node (upon receipt of an instruction from the first node to do so).

The method may also comprises, when the mobile terminal is handed over from the first node to a second node, the mobile terminal transmitting, to the second node, information about the key management capabilities of the mobile terminal.

The information may be included in one or more signalling messages relating to completion of the relocation.

Modifying the first key may comprise modifying the first key using the first key and optionally but preferably also using information relating to the second node.

A third aspect of the invention provides a node for serving a mobile terminal, the node comprising a module for maintaining information about the key management capabilities of a mobile terminal being served by the node over a connection protected by at least one first key, and said first key. The node further has a module for, upon relocation of the mobile terminal to a second node, if, and only if, said key management capabilities indicate an enhanced key management capability supported by the mobile terminal, modifying the first key, thereby creating a second key, and also has a module for sending, from the first node to the second node, the second key.

The node may further comprise a module for transmitting to the second node the information about the key management capabilities of the mobile terminal.

A fourth aspect of the invention provides a mobile terminal comprising a module for maintaining information about the key management capabilities of a first node serving the mobile terminal over a connection protected by at least one first key, and the first key. The mobile terminal may further have a module for, upon relocation of the mobile terminal from the first node to a second node, if, and only if, said key management capabilities indicate an enhanced key management capability supported by the first node, modifying, by said mobile terminal, the first key, thereby creating a second key.

The mobile terminal may further have a module for transmitting, from the mobile terminal to the second node, information about the key management capabilities of the mobile terminal.

In a node of the third aspect or a mobile terminal of the fourth aspect the modules may be implemented in hardware as separate hardware modules or combined in one hardware module, or they may be implemented as one or more software modules operating on a suitably-programmed processor, or they may be implemented as combination of hardware and software modules.

BRIEF DESCRIPTION OF THE DRAWINGS

Preferred embodiments of the invention will be described, by way of example, with reference to the accompany figures in which:

FIG. 2(*b*) illustrates hard handover with SRNS relocation

FIG. 2(*c*) illustrates combined cell/URA with SRNS relocation update;

DETAILED DESCRIPTION

Figure 1:
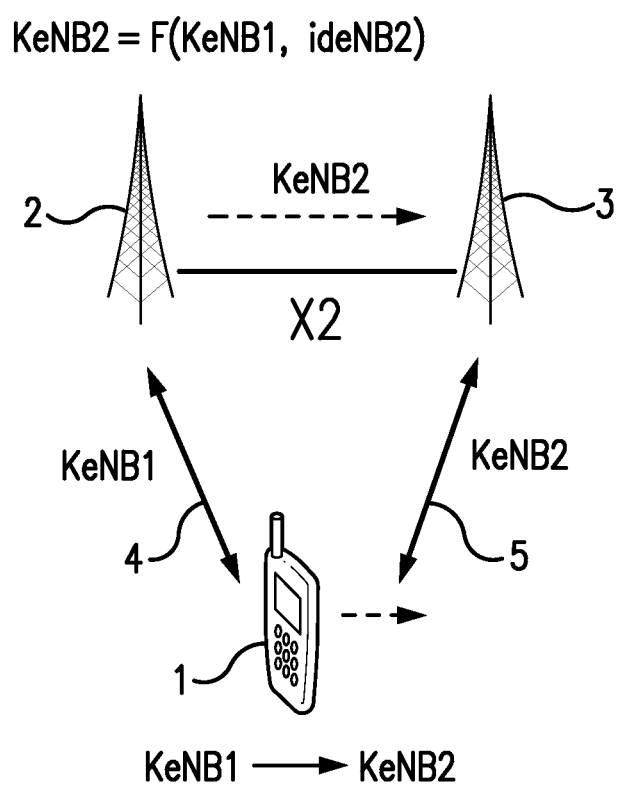
FIG. 1 illustrates the principle of "key tweaking" in communications to/from a mobile terminal.

For simplicity of discussion let us denote by "RNC+" an updated RNC which is able to understand that the key(s) should be changed at SRNS relocation, if possible. Similarly an "ME+" denotes an updated ME, that is an ME that also is aware of the possible need to change key(s) at SRNS relocation. A "source RNC" or "source RNC+" is the RNC, or RNC+, which serves an ME/ME+ (via a base station) before relocation, and a "target RNC" or "target RNC+" is an RNC or RNC+ which serves an ME/ME+ (via a base station) after relocation.

Issues to be addressed include the following:

It is critical that the key(s) used in the network (i.e., in the target RNC(+)) after the relocation are always the same as the key(s) used in the ME(+) after the relocation, as otherwise security processing will fail and connection to the network is lost.

It is desirable that the key(s) are changed on relocation in as many cases as possible, i.e. if the mobile terminal is an ME+ and at least one of the source or target RNC is an RNC+, then it is desirable to change key(s).

It is desirable that the key(s) used in the source RNC are kept secret from the target RNC to as great an extent as possible. In practice, this means that the change of key (key tweaking) should, whenever possible, be performed in the source RNC+ before transferring the key to the target RNC (which may or may not be updated).

As the ME, the source RNC and the target RNC each may or may not be updated, a number of scenarios exist, for example:

1. If a ME+ is involved in SRNS relocation from an RNC+ to an RNC+ it is desirable for the key(s) to change in both the ME+ and the source RNC+ (assuming that the key(s) are changed in the source RNC+ and the new key(s) are passed to the target RNC+). How do the ME+ and RNC+ (mutually) know about each other's capabilities? If the ME+ and RNC+ are not both properly informed of the other's capabilities, one of the ME+ and the RNC+ may perform the key modification while the other does not—which would result in key mismatch, implying e.g. ciphering failure and hence the connection to the network will be lost.

2. If an ME is involved in SRNS relocation between any combination of RNC and RNC+ (ie, RNC+ to RNC or RNC to RNC+) the key(s) must not change on the network side since the key(s) cannot change on the ME side. Suppose that the source RNC is an RNC+—how does it know which key(s) to provide to the target RNC, i.e. how does it know whether the ME is actually an ME+ and/or that the target RNC is capable of handling key tweaking?

3. If a ME+ performs relocation from an RNC to an RNC the key(s) must not change in the ME+ since the key(s) will certainly not change on the RNC side (as the source RNC and target RNC is each a legacy RNC). Since the ME+ does not know whether or not the RNCs are updated, how would the ME+ know whether to "tweak" the key(s)?

4. If a ME+ performs a relocation where the source and target RNC are of different types (i.e. RNC+→RNC or RNC→RNC+) is it possible to change the key(s)? If so, does the target or source RNC change the key(s)? How does the ME+ know whether the key(s) are tweaked on the network side, i.e. if it shall also tweak the keys?

5. If an ME+ is handed-over from one RNC (updated or not) to an RNC+, how does the target RNC+ know that the ME is an ME+?

Figure 2A:
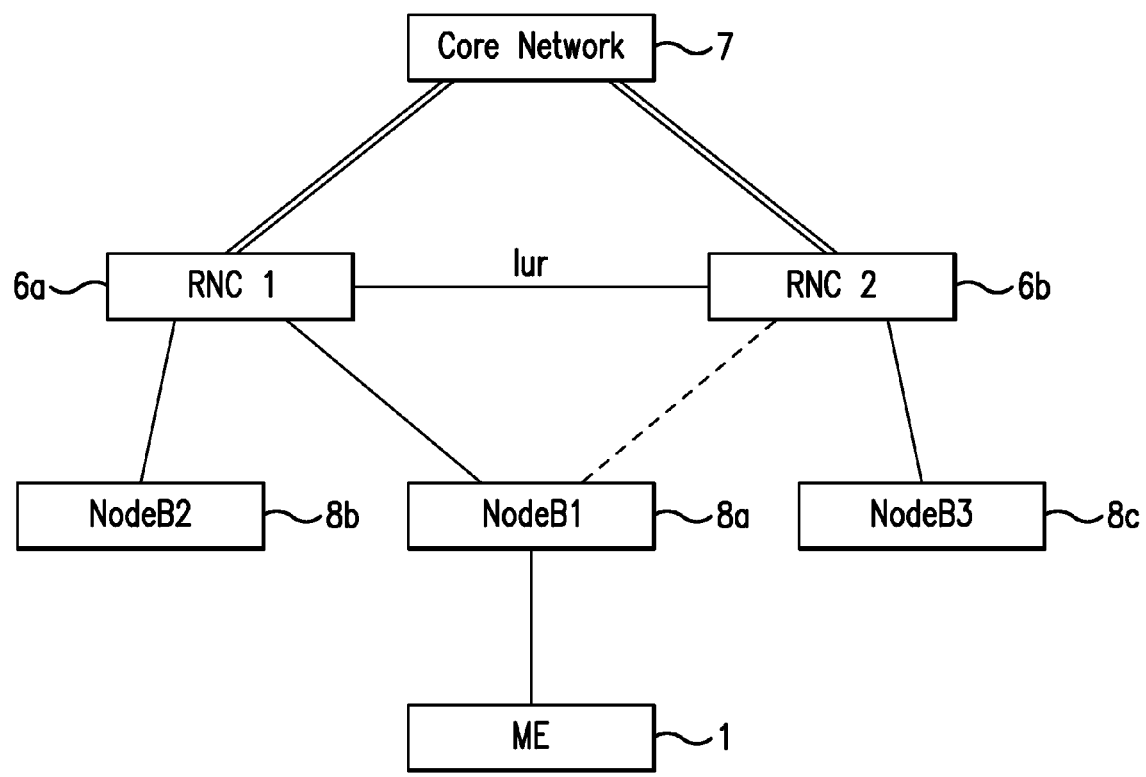
FIG. 2(*a*) illustrates SRNS relocation without ME involvement.
Figure 2B:
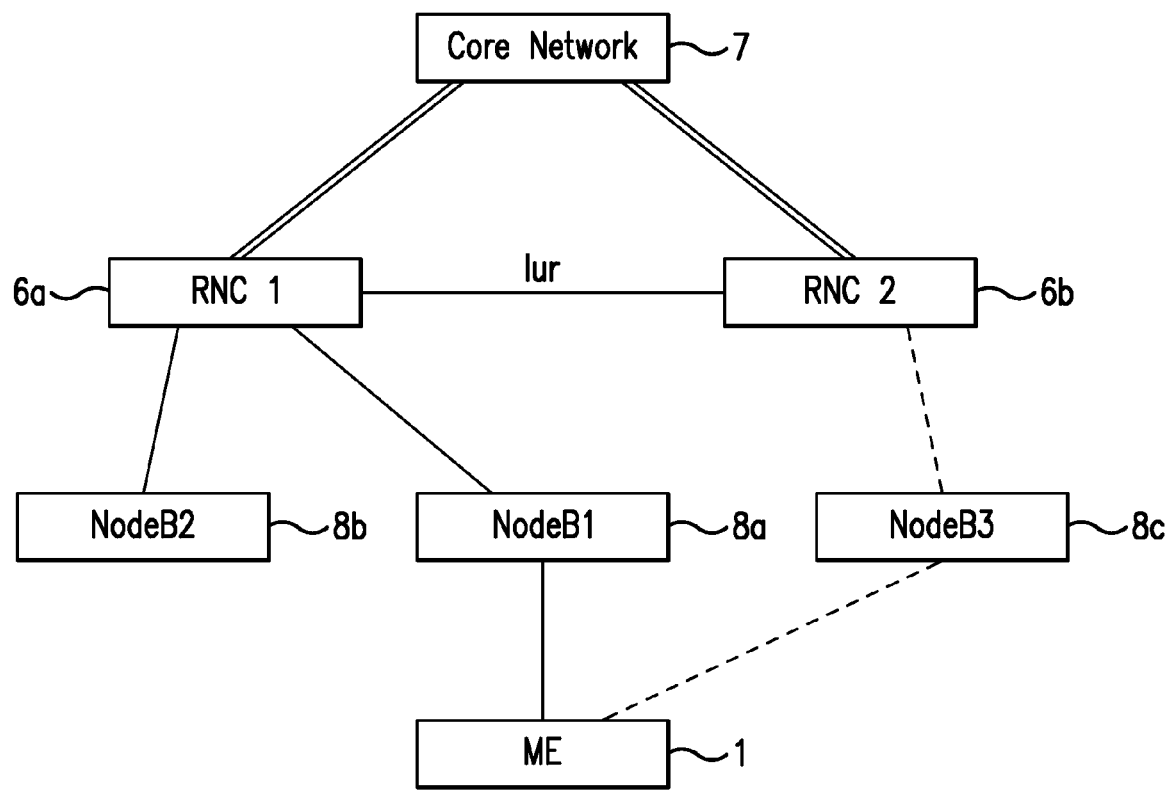

As explained earlier these problems do not occur in terminals and networks operating according to the current LTE standard since the mobile terminal and the network will always be able to tweak a key on relocation—so that both the network and the mobile terminal know at all times that the other entity is capable of changing the key(s). In addition, in the LTE standard, the change of key(s) is as mentioned always coupled with a hard handover as shown in FIG. 2(b), and the handovers shown in FIGS. 2(a) and 2(c) do not occur in LTE. However, should enhanced key management capabilities and/or new relocation mechanisms be introduced in the LTE standard in the future, the invention may be applied there as well.

Figure 2C:
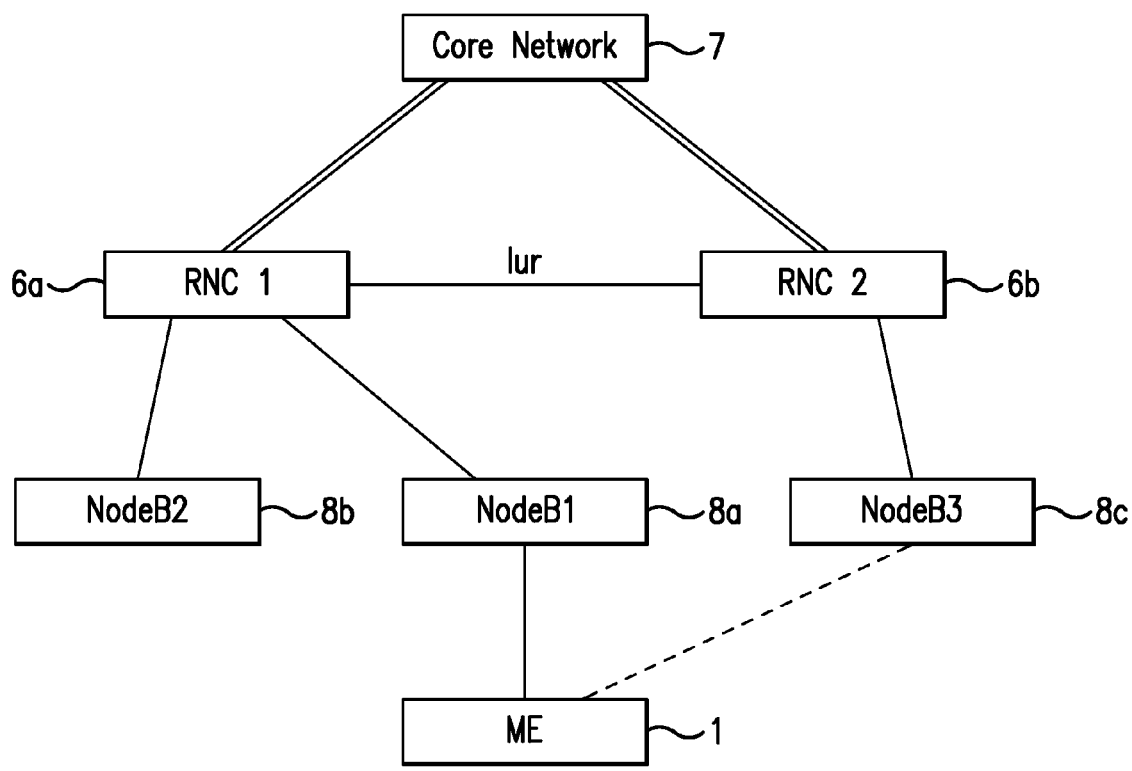

Embodiments of the invention will be described with reference to the three possible relocation schemes shown in FIGS. 2(a) to 2(c). As noted, the source and target RNC may communicate with each other via the core network to coordinate the relocation or, in later versions of the UTRAN standard, the RNCs may communicate directly with each other via the Iur interface. For simplicity, the description below describes how the invention is effected when the RNCs may communicate directly with one another, but the invention may readily be applied to a case where the RNCs communicate with one another via the core network.

The invention will be described with reference to embodiments in which communication between the RNC and the ME is secured by two or more keys (for example a ciphering key and an integrity key) and so will refer to changing, or "tweaking", keys, but the invention may readily be applied to a case where communication between the RNC and the ME is secured by only a single key, since the same principles apply. Similarly, in the case that plural keys are used, the "tweaking" may be applied to all of the keys or only to a selected subset of the keys, e.g. to the packet switched (PS) domain keys, but not to the circuit switched (CS) domain keys, etc.

Moreover, the invention as described below focuses on the problem of deciding (mutually, in ME+ and source/target RNC+) whether to modify (tweak) the keys or not. Thus, it is assumed that the key modifying function (above denoted f) is fixed so that the choice is only on whether to apply f or not to apply f. In general, however, there could also be different choices for which function f to apply. Specifically, the invention deals with maintaining information regarding support for one or more key management capabilities which, besides support/non-support of a given f-function, in general could also comprise which f-functions, if any, are supported. Other, more general security capabilities could also be handled in a similar manner.

Moreover, the invention does not relate to the particular form of the key modifying function, and any suitable key modifying function may be used. As an example, the key modifying function may modify the key using the key and optionally but preferably also using information relating to the target node, for example according to $K_{eNB}2=f(K_{eNB}1, eNB2\_ID)$, but this is only one possible example and the invention is not limited to this.

In all embodiments, the key modifying function, f, is preferably based on a suitable (strong) cryptographic function, e.g. SHA256, HMAC, AES, or the like.

In the description of the invention the following terminology will be used:

Legacy entity An entity which is not aware of the enhanced key handling.

Updated entity An entity that is updated and capable of dealing with the enhanced key handling.

The terms "source" and "target" refer, as usual, to entities to which an ME is connected before/after a change of RNC.

As used above, entities which are updated have a plus sign appended to their name, e.g., an updated ME is written as "ME+". If it is irrelevant whether or not an entity is updated or if a certain property applies to both updated and legacy entities the notation (+) is used, e.g., ME(+) is used to denote both/either of an updated ME (ie, ME+) and a legacy ME.

The invention makes use of the following property: an updated node/mobile terminal can add information elements (IE) to signalling messages, and these IEs will simply be ignored by a legacy node/terminals that receives the signalling message. As an example, 3GPP network protocols are designed in this way. This implies that:

It is always safe for an updated node to add new IEs to a signalling message even if it does not know if the node it is sending/transmitting it to is updated or not.

If an updated node detects the presence of a new IE in a signalling message, it knows (or more precisely, it can safely deduce) that the node that generated the signalling message is also updated.

The principle of the invention is as follows.

At initial attach of an updated ME (ie an ME+) to a network, the updated ME will inform the network that is capable of the enhanced key management functions (and an ME that is not updated will of course not do this). There are several options for handling the ME's enhanced key capabilities at the initial attach. One option is that this can be achieved via the normal registration procedures when an ME(+) that is attaching to the network informs the core network about its capabilities. All that is needed is for the existing ME capability signalling with the core network to be amended to include information (a new IE) about the enhanced key capabilities of the ME, so that the core network is made aware that the attaching ME is an updated ME. The core network then informs the RNC about the ME's enhanced key capability.

Another option is for the ME to inform the core network about its enhanced key capability with the core network and radio access network separately. The RAN (RNC) would then need to be responsible for informing the ME of its capabilities independently of the core network. An alternative but less flexible approach is to require that an RNC+ is only allowed to connect to an updated VLR/MSC/SGSN, since then the VLR/MSC/SGSN can inform the ME on the capabilities on behalf of the RNC.

It should be understood that the exact procedure used at initial attach is outside the scope of the invention. The invention will be described on the assumption that some suitable procedure (which may be one of the above procedures or may be some other procedure) has been used to initially (and mutually) establish the capabilities between the RNC(+) and the ME(+).

Once an ME+ has attached to the network, an important feature of the present invention is to maintain the property that an ME+ always knows if the current (serving) RNC is an updated RNC, and that an updated serving RNC always knows if the ME is an updated ME or not.

A problem that the invention solves in respect to interworking with legacy nodes is that, after SRNS relocation of an ME from a legacy RNC, this may cause a "hole" in book-keeping since a legacy RNC may not be able to inform the next RNC to serve the ME of properties of the ME which the legacy RNC does not support and/or understand. To illustrate this, in a sequence of RNC relocations: from a RNC+ to an RNC and then to a new RNC+, even if the first RNC+ transfers ME capabilities to the RNC, this RNC is not guaranteed to be able to convey these capabilities to the final RNC+ in the sequence. This needs to be addressed since otherwise, as soon as a single legacy RNC is involved in a chain of RNC changes, we have to resort to legacy key handling in all future RNC changes even if a subsequent serving RNC and the ME are both updated. The invention maintain this property (that an ME+ always knows if the current (serving) RNC is an updated RNC, and that an serving updated RNC (ie, RNC+) always knows if the ME is an updated ME or not) using communication between the ME+ and an RNC+ and/or communication between RNCs. The property is maintained by informing the ME about whether or not the RNC it is moving to is updated, and informing the target RNC whether or not the ME is updated.

One part of the invention deals with SRNS relocation, which occurs in an active mode (such as defined in TS23.060) (or in the RRC CONNECTED state as defined in the UTRAN RRC spec 25.331). The IDLE mode RAU (Routing Area Update) procedures such as described in TS 23.060 (Section 6.9.2.1) are handled in a similar way as the initial attach. When a UE moves in IDLE mode and appears under a new RNC, then the UE establishes a new RRC connection and the corresponding actions taken at initial attach may be used also here.

Note that IRAT (Inter Radio Access Technology) relocation to/from other radio access technologies (e.g. all aspects of PS Handover of TS 43.129) is not specifically addressed by the invention. This means that an ME that is handed over from a network operating according to the GERAN (GSM EDGE Radio Access Network) or E-UTRAN standard will not use the enhanced key management capability even if both the ME and the RNCs are updated. This is necessary since we cannot trust that the source network was able to detect that the ME had certain enhanced UTRAN capabilities and thus we cannot assume that a GSM/LTE network is able to transfer this information to the 3G/UMTS network. From the updated ME (ie ME+) point of view, this is not a problem since the updated ME (ie ME+) knows that after any IRAT handover, the network shall treat it as a legacy ME, at least initially.

For simplicity, the description makes no distinction whether we discuss PS or CS keys (whose usage depend on the type of service used), since the same principle apply to each type of key. Also, it should also be noted that the control plane key(s) may be different from the user plane keys. Specifically, the control plane keys are always based on the domain (CS/PS) that was most recently security-activated, which could differ from the domain in which the current data plane service is run. In this case, the invention may then be applied to both sets of keys.

How the invention modifies the keys, and maintains the knowledge in the various entities (ie, the ME and the RNC) about the corresponding entity is updated or not, will be described for all the three cases of SRNS relocation described with reference to FIGS. 2(a) to 2(c): SRNS relocation without ME involvement (FIG. 2(a), see 6.9.2.2.1 of TS 23.060), combined hard handover and SRNS relocation (FIG. 2(b), see 6.9.2.2.2 of TS 23.060) and combined cell/URA update and SRNS relocation (FIG. 2(c), see 6.9.2.2.3 of TS 23.060).

Since after initial attach to the system, an updated ME (ie ME+) knows whether it is connected to an updated RNC (ie, RNC+) or not (and vice versa), we only need to consider two sub-cases for each of the SRNS relocation variants:
1. The initial state of the system before the procedure begins is that the ME+ is connected to an RNC+.
2. The initial state of the system before the procedure begins is that the ME+ is connected to an RNC.

We do not need to consider cases where the ME is not updated. The reason for this is that since the invention allows all updated RNCs to have knowledge about whether the ME is updated or not, and it is only updated RNCs that perform any enhanced change (or tweaking) of keys, the methods of the invention do not perform any key tweaking if the ME is not updated. The indication of which entities are updated and which are not is however still necessary in the case of a legacy ME so that an updated RNC is made positively aware it is corresponding with a legacy ME. Note that only updated entities transfer explicit information to indicate their status. Legacy entities do not send any information about being updated so, in the case of a legacy entity, the indication that the entity is not updated is instead made through a lack of information received at a corresponding node.

The cases are listed in the matrix below for easier view.

Figure 3:
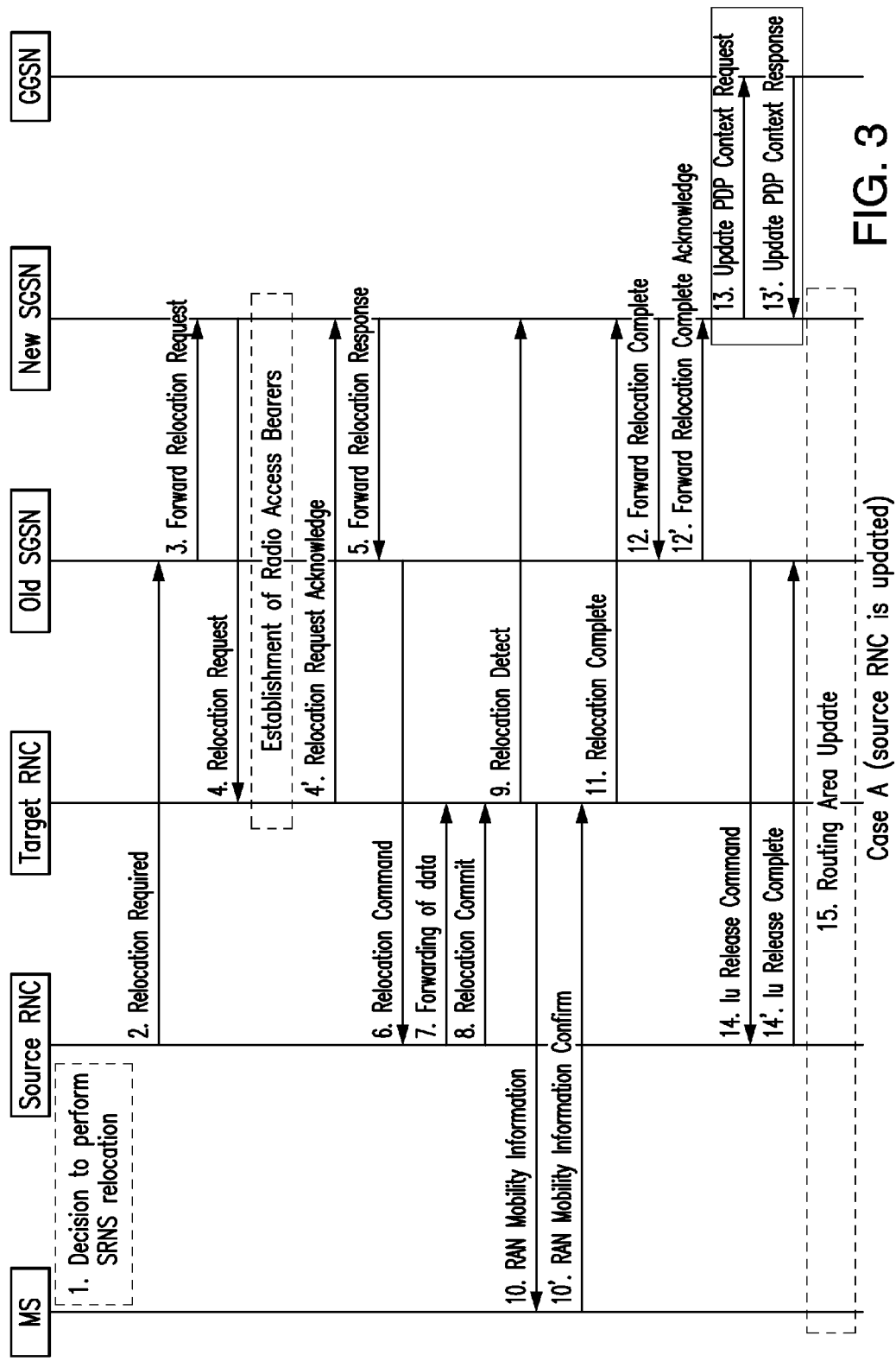
FIG. 3 illustrates message flows in a method according to a first embodiment of the present invention.
Figure 5:
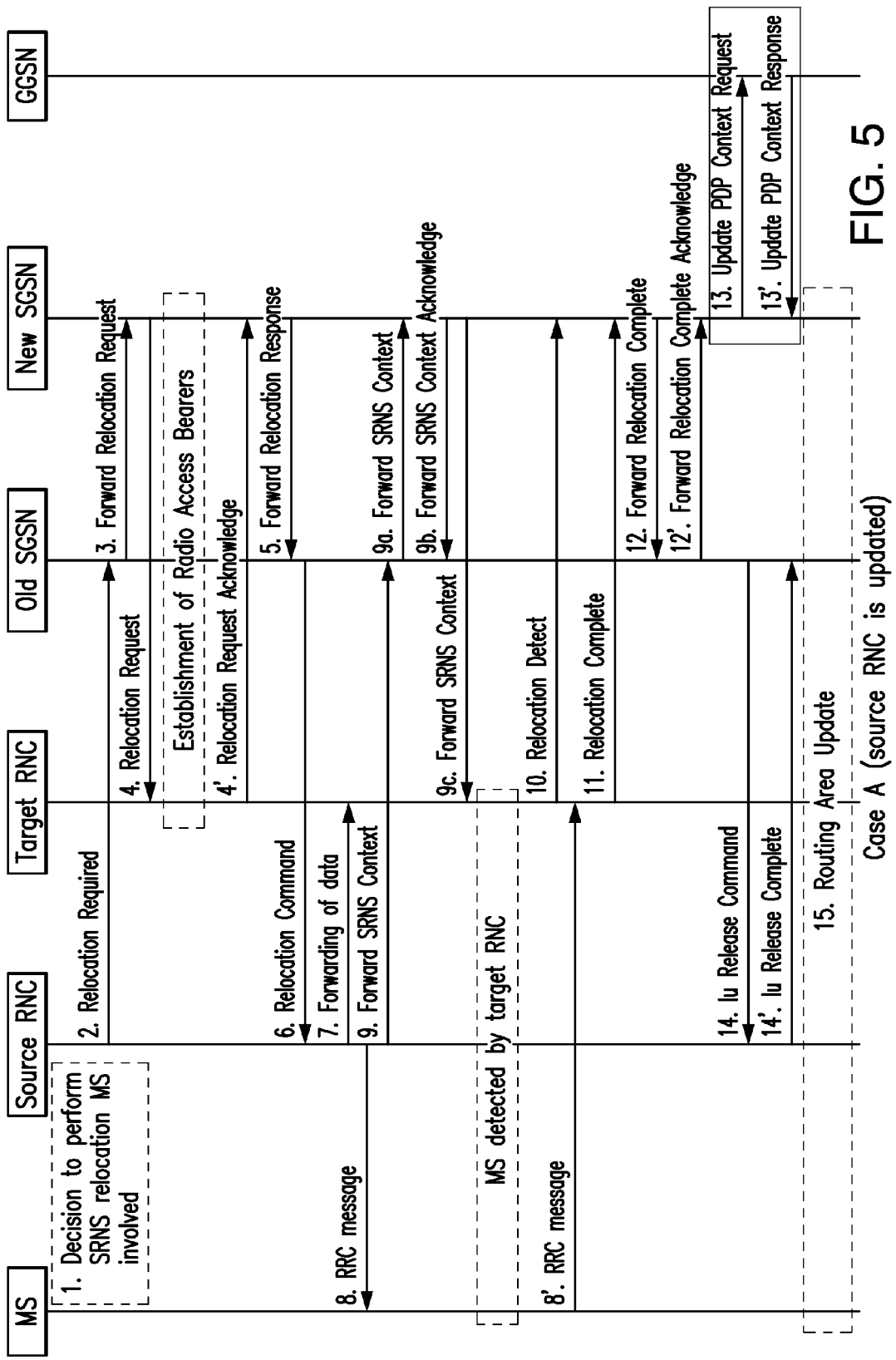
FIG. 5 illustrates message flows in a method according to a second embodiment of the present invention.
Figure 7:
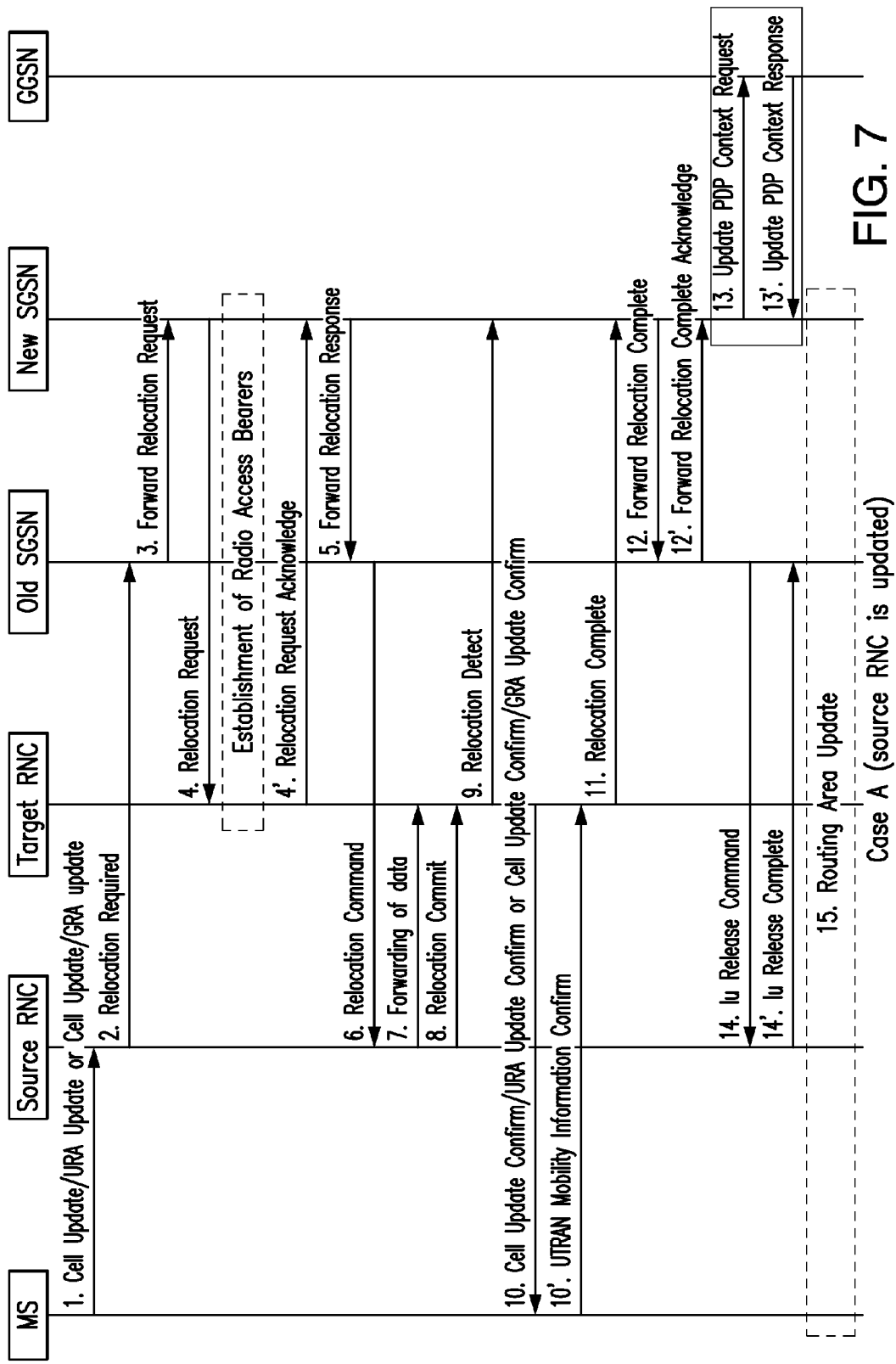
FIG. 7 illustrates message flows in a method according to a third embodiment of the present invention.

|  | Source RNC is updated | Source RNC is not updated |
| --- | --- | --- |
| SRNS relocation without ME involvement | FIG. 3 | Use legacy procedures, i.e. no key tweaking |
| Combined hard handover and SRNS relocation | FIG. 5 | Use legacy procedures, i.e. no key tweaking |
| Combined cell/URA update and SRNS relocation | FIG. 7 | Use legacy procedures, i.e. no key tweaking |

First, application of the invention to SRNS relocation without ME involvement will be described.

FIG. 3 shows the signalling that occurs upon SRNS relocation without ME involvement. FIG. 3 is taken from clause 6.9.2.2.1 of TS 23.060, and shows the PS version of the SRNS relocation without ME involvement. The invention only makes use of the following properties in the signalling:

there is a path to signal from the source RNC(+) to the target RNC(+) (this is the so-called source RNC to target RNC transparent container)

there is a procedure initiated from the target RNC(+) to which the ME(+) responds (for PS this is the RAN Mobility Information message exchange).

For the CS case the corresponding features are used.

In the signalling shown in FIG. 3, a decision to perform SRNS relocation is taken at 1, at 2 the source RNC signals to the current ("old") SGSN (Serving GPRS Support Node) that SRNS relocation is required, and at 3 the current SGSN informs the target ("new") SGSN that SRNS relocation is required.

At 4 the target SGSN informs the target RNC that SRNS relocation is required, and radio bearers are established between the target SGSN and the target RNC. At 4' the target RNC returns an acknowledgement to the target SGSN. At 5 the target SGSN informs the current SGSN that the request for SRNS relocation is being processed.

At 6 the current SGSN sends a relocation command to the source RNC that informs the source RNC of the identity of the target RNC, and at 7 and 8 the source RNC sends data and a relocation commit signal to the source RNC. The target RNC then informs the new SGSN of the relocation by sending a relocation detect message at 9. At 10 the target RNC sends RAN mobility information to the mobile station, and the mobile station acknowledges this by sending a RAN mobility information confirm message at 10'. At 11 the target RNC then informs the target SGSN that relocation is complete, at 12 the target SGSN then informs the old SGSN that relocation is complete, and at 12' the old SGSN acknowledges to the target SGSN that it has received the relocation complete message.

The target SGSN then send, at 13, an update PDP context request to the GGSN (Gateway GPRS Support Node), and the GGSN sends a response at 13'. Also, the old SGSN sends an Iu release command to the source RNC at 14 and, when Iu release is complete, the source RNC signals this to the old SGSN at 14'. A routing area update is then carried out at 15.

As noted above for each relocation mechanism there are two cases to consider—(A) where the source RNC is updated and (B) where the source RNC is not updated. Case A will initially be described.

Key tweaking—in case A, where the source RNC is updated, the main problem stems from that the ME+ is not aware of the change of RNC until the ME+ receives the RAN Mobility Information message 10. That implies that the ME+ must receive, verify the integrity protection of the RAN Mobility Information message 10 and decrypt the message 10 before the ME+ knows that it should change its CK and IK. Unfortunately, when the ME+ receives message 10, from the point of view of the ME+ the ME+ simply receives a signalling message and does not know that it is part of an ongoing relocation process (since the ME+ has not yet been involved in the relocation). Therefore the ME+ cannot know whether a message it receives is sent by the source RNC (and in that case protected by the old, non-tweaked CK/IK) or if it is RAN Mobility Information message sent by a target RNC+ (and hence protected by the tweaked CK/IK).

One way for the invention to overcome this is for the ME+ to initially use the current CK/IK, and then try with a tweaked CK/IK if the integrity protection of a received message fails using the current CK/IK. This is however not very clean, nor an optimally secure design. Instead, a preferred embodiment is that the source RNC+ in this case instead performs a local SRNS relocation back to itself (an "intra-RNC SRNS relocation") immediately before doing the real SRNS relocation to the target RNC (this local SRNS relocation back to itself would be performed before step 8 in the figure above). When doing the second SRNS relocation, that is the relocation to the target RNC, the source RNC+ provides the target RNC with the tweaked keys CK/IK derived at the first intra-RNC SRNS relocation. The result of doing this is that only the traffic sent between the ME+ and the source RNC in the time between the two SRNS relocations would be compromised in the case that the target RNC is compromised. In addition, no change of existing procedures is needed.

Maintaining the knowledge of which entities are updated—since the source RNC+ is updated it knows whether or not the ME+ is updated, and in this case the source RNC+ sends an indication of whether the ME+ is updated or not to the target RNC+. This indication is, in a preferred embodiment, a new information element (IE) in the MS capabilities which are sent from the source RNC to the target RNC in the Source SRNC to Target RNC Transparent Container—this container is included in the Relocation required message (message 2 in FIG. 3) and is then forwarded to the target RNC (for example via messages 3 and 4). This implies that after the SRNS relocation without ME involvement, the target RNC (+) knows whether the ME+ is updated or not (if the target RNC is itself updated).

When the target RNC(+) sends the RAN Mobility Information message 10 to the ME+, according to the invention it includes in the message 10 explicit information that the target RNC(+) is an updated RNC if, and only if, the target RNC(+) is an updated RNC. If the ME+ receives such explicit information in the message 10 it knows that the target RNC is updated. If such information is lacking from the RAN Mobility information message 10, the ME+ can conclude that the target RNC(+) is not updated. The information whether the target RNC(+) is updated may alternatively be sent in a "later" message, but that may cause a race condition with the sequence in the combined cell/URA relocation to be described below. A race condition could for example occur if the target RNC (this will be called RNC1 in this example, for clarity) does not inform the mobile terminal whether it is updated or not in message 10, and there is a further relocation to another RNC (this will be called RNC2) before RNC1 has informed the mobile terminal whether it is updated or not. If this happens, the mobile terminal would not know whether to tweak the keys or not upon the further relocation from RNC1 to RNC2, as the mobile terminal would not know whether RNC1 was an updated RNC or not. It may also be advantageous to include an "ME+ capability indication" in CELL/URA Update Confirm messages, since a mobile terminal may arrive in a cell having an updated RNC that way from an "old RNC", which has not maintained knowledge that the ME is updated.

Since that it is not guaranteed by the current UTRAN standard that a legacy RNC shall forward unknown parts of the MS capability information, it cannot be assumed that a legacy RNC will forward information whether the ME is updated or not. However, a solution to this problem is that the ME+ may include an indication in the RAN Mobility Information Confirm message (see message 11 in the message flow of FIG. 3) that it is updated. If the target RNC(+) finds that the indication is missing from the message 11 it can conclude that the ME is not updated.

Application of the invention to SRNS relocation without ME involvement for case B, where the source RNC is not updated, will now be described.

Key tweaking—a legacy source RNC does not know anything about the enhanced key changes, and simply acts according to its existing behaviour. Since the ME+ knows whether it is connected to a legacy RNC or to an updated RNC, the ME+ does not perform any key tweaking when it is informed that SRNS relocation without ME involvement has occurred when it is currently connected to a legacy RNC.

Maintaining the knowledge of updated entities—A legacy source RNC does not know anything about the enhanced key changes, and simply acts according to existing behaviour.

When the target RNC(+) sends the RAN Mobility Information message to the ME+ at message 10, according to the invention if and only if the target RNC(+) is an updated RNC it includes information that it is updated. This ensures that the ME+ knows whether the target RNC(+) is updated or not—if the target RNC(+) does not provide information that it is updated, the ME+ will take this as an indication that the target RNC(+) is a legacy RNC. In the response message from the ME+, the RAN Mobility Information Complete message 10', the ME+ includes an indication whether it is updated (which a legacy ME would not do). This ensures that the target RNC will, if it is an updated RNC, know whether the ME(+) is updated or not.

Figure 4:
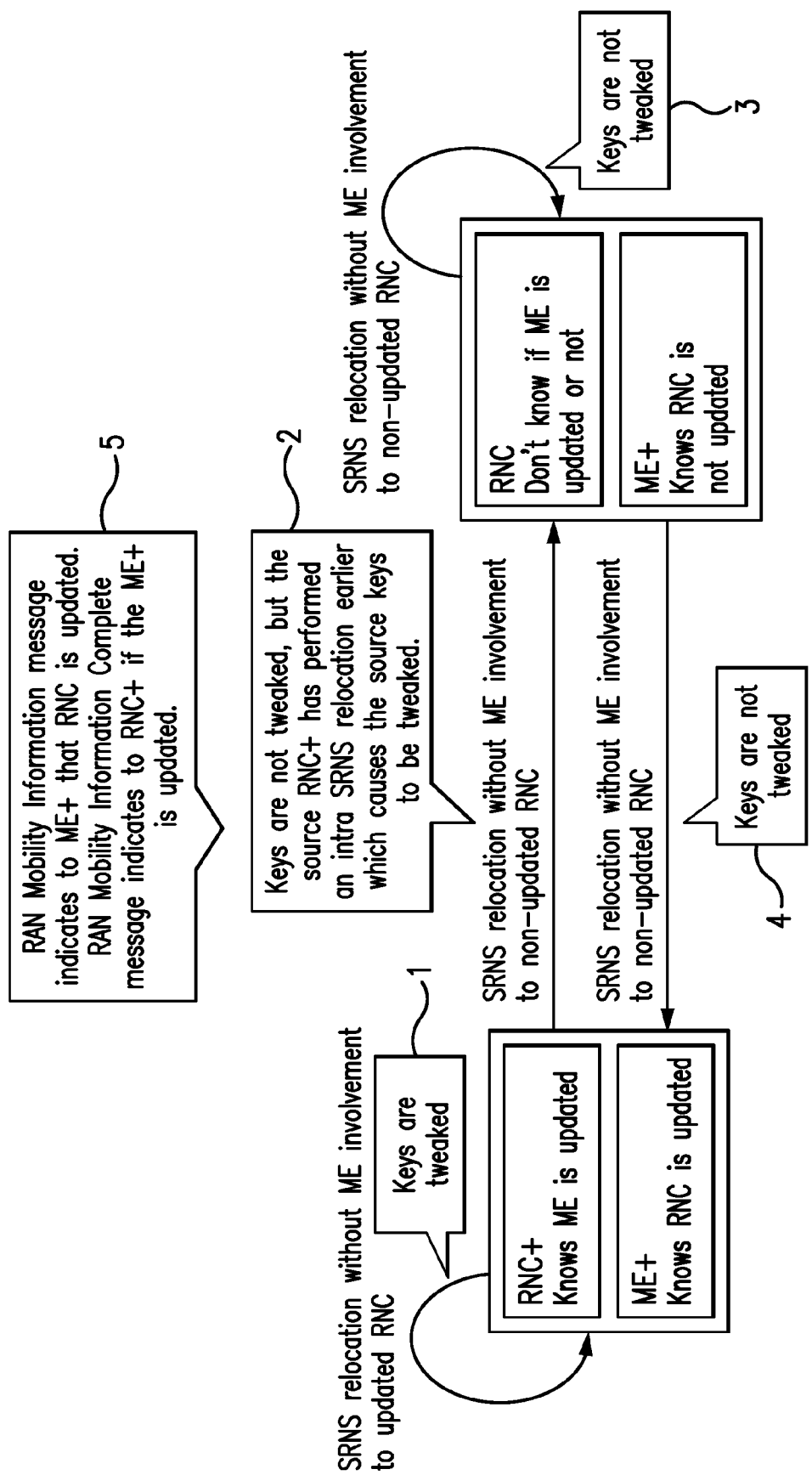
FIG. 4 illustrates the principal steps of a method according to the first embodiment.

FIG. 4 is a state chart that shows how knowledge is maintained in the RNC(+)s and the ME+ at SRNS relocations without ME involvement.

The left of FIG. 4 shows the state where the ME+ is being served by an updated RNC, i.e. an RNC+. The ME+ knows that the RNC is updated, and the RNC+ knows that the ME is updated. If SRNS relocations without ME involvement occurs to a target RNC that is updated, the keys are tweaked at 1 by both the source RNC+ and the ME+.

If SRNS relocations without ME involvement occurs to a target RNC that is not updated, the keys are not tweaked upon relocation as such. However, as described above the source RNC may perform an intra SRNS relocation which causes the keys to be tweaked by both the source RNC+ and the ME+ at 2, before the relocation to the new RNC.

The right of FIG. 4 shows the state where the ME+ is being served by an RNC that is not updated. The ME+ knows that the source RNC is not updated, but the RNC does not know that the ME is updated. If SRNS relocations without ME involvement occurs, they keys cannot be tweaked by the source RNC since it is not updated, and the keys are also not tweaked by the ME+ (even though the ME+ is capable of tweaking the keys) as shown at 3 and 4.

As indicated at 5, information whether the target RNC is updated is preferably included in the RAN Mobility Information message from the target RNC to the ME+ (message 10) and information whether the ME is updated is preferably included in the RAN Mobility Information Complete message to the target RNC (message 10') (or in the source RNC to target RNC transparent container).

If there is a change of SGSNs or MSC/VLR during this procedure, the information whether the ME(+) and/or SGSN/MSC/VLR is updated or not is taken care of in the Routing/Location Area Update procedure following the SRNS relocation without ME involvement. On the core network side an alternative is that the source SGSN/MSC/VLR informs the target SGSN/MSC/VLR about the ME(+) enhanced key handling capabilities when transferring the MS capabilities. This alternative may not work if SGSN/MSC/VLR discards new information elements in the MS capability which it does not understand.

Next, application of the invention to combined hard handover and SRNS relocation will be described.

FIG. 5 shows the signalling that occurs upon combined hard handover and SRNS relocation. FIG. 5 is taken from clause 6.9.2.2.2 TS 23.060 and shows the PS version of the combined hard handover and SRNS relocation procedure. The invention only makes use of the following properties in the signalling:

there is a path to signal from the source RNC(+) to the target RNC(+) (this is the source RNC to target RNC transparent container)

there is a path to signal from the target RNC(+) to the source RNC(+) (this is the target RNC to source RNC transparent container)

the target RNC to source RNC transparent container contains a message which is delivered to the ME(+) by the target RNC(+) when received in the container. (This is the RRC message contained in the container).

For the CS case the corresponding features are used.

In the signalling shown in FIG. 5, messages 1 to 7 correspond to messages 1 to 7 of FIG. 3 and their description will not be repeated.

At 8 the source RNC sends an RRC (Radio Resource Control) message to the mobile terminal. At 9 the source RNC forwards the SRNS context to the old SGSN, and at 9a the old SGSN forwards the SRNS context to the new SGSN. The new SGSN then sends an acknowledgement to the old SGSN at 9b, and forwards the SRNS context to the target RNC at 9c. After the mobile terminal has been detected by the target RNC, the target RNC informs the new SGSN of the relocation by sending a relocation detect message at 10, and at 8' the mobile terminal sends an RRC message to the target RNC.

Messages 11 to 15 of FIG. 5 correspond to messages 11 to 15 of FIG. 3 and their description will not be repeated.

As noted above, for each relocation mechanism there are two cases to consider—(A) where the source RNC is updated and (B) where the source RNC is not updated. Case A will initially be described.

Case A (source RNC is updated)—Tweaking of keys—in this case the key tweaking can be combined with the actual relocation signalling and it is not necessary for the source RNC(+) to perform a separate intra-SRNS relocation to tweak the CK/IK before the relocation (as is the case for SRNS relocation without ME involvement). Since a relocation as here described is more time critical than a SRNS relocation without ME involvement this combining gives great benefits.

Since the source RNC+ knows that the ME+ is updated, it will tweak the CK/IK before sending them to the target RNC (+) in the source RNC to target RNC transparent container. The container is included in the Relocation required message (message 2 in the flow chart above). The target RNC(+) uses the keys in the same way as in legacy systems, and does hence not know (and does not need to know) if they have been tweaked or not.

If the ME is updated it knows whether the source RNC(+) it is being served by is updated or not, and according to the invention the ME tweaks the CK/IK if (and only if) the source RNC(+) is an updated RNC. The ME+ and the target RNC+ start using the tweaked keys from and including the RRC message from the ME+ to the target RNC+ (uplink message 8 in FIG. 5).

Maintaining the knowledge of updated entities—according to the invention the source RNC+ sends an indication whether the ME is updated or not to the target RNC(+) in the source RNC to target RNC transparent container (alternatively this indication could be included in the MS capabilities IE). This way a target RNC+ will get to know whether the ME(+) is updated or not.

According to the invention a target RNC+ includes information that it is updated in a new IE in the RRC message included in the target RNC to source RNC transparent container. This RRC message is then forwarded to the ME by the source RNC(+) in the downlink message 8 in FIG. 5. The target RNC would not include such information if it is a legacy RNC. In this way, depending on whether this information is received or not, the ME(+) is informed whether the target RNC(+) is updated or not.

Case B (source RNC is not updated)—Tweaking of keys—since the source RNC is not updated, hence no key tweaking is performed either by the ME+ or the source RNC.

Case B (source RNC is not updated)—maintaining the knowledge of updated entities—the ME(+) learns if the target RNC(+) is updated in exactly the same way as in the case the source RNC(+) was updated.

In a case where the source RNC is a legacy RNC, it will not provide any information to the target RNC(+) that the ME(+) is updated or not. This means that the target RNC(+) will not know whether the ME+ is updated or not. However, an updated ME+ may, according to the invention, include information that it is updated in the uplink RRC message number

8' in the flow chart above. This implies that an updated target RNC+ would still be able to use key tweaking in a future SRNS relocation.

Figure 6:
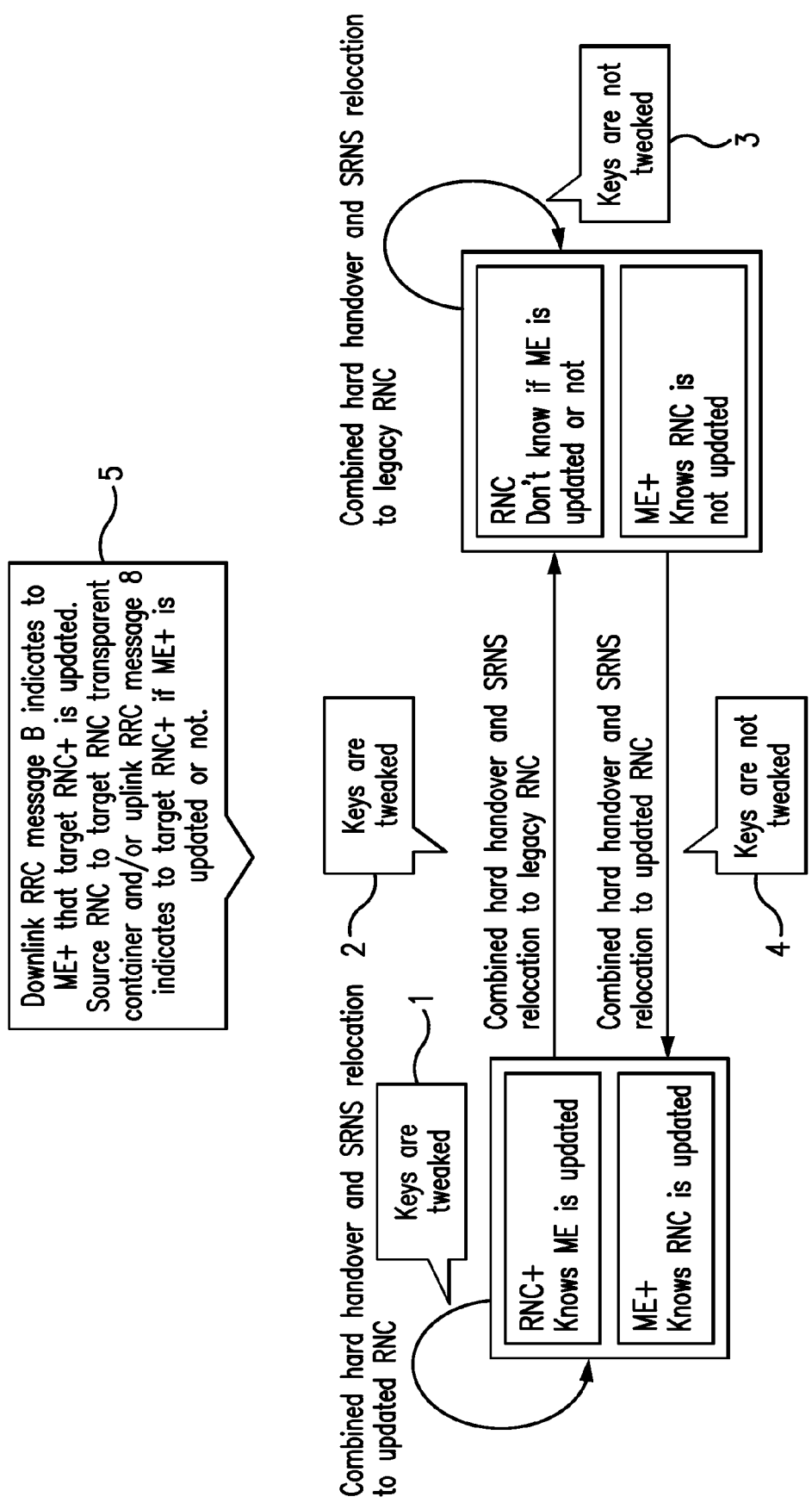
FIG. 6 illustrates the principal steps of a method according to the second embodiment.

FIG. 6 is a state chart that shows how knowledge is maintained in the RNC(+)s and the ME+ at combined hard handover and SRNS relocations.

The left of FIG. 6 shows the state where the ME+ is being served by an updated RNC, ie by an RNC+. The ME+ knows that the source RNC is updated, and the source RNC+ knows that the ME is updated. If combined hard handover and SRNS relocation occurs to a target RNC that is updated, the keys are tweaked at 1 by both the source RNC+ and the ME+.

If combined hard handover and SRNS relocation occurs to a target RNC that is not updated, the keys are also tweaked by both the source RNC+ and the ME+ at 2.

The right of FIG. 6 shows the state where the ME+ is being served by an RNC that is not updated. The ME+ knows that the RNC is not updated, but the RNC does not know that the ME is updated. If combined hard handover and SRNS relocation occurs, the keys cannot be tweaked by the source RNC since it is not updated, and the keys are thus not tweaked by the ME+ either (even though the ME+ is capable of tweaking the keys) as shown at 3 and 4.

As indicated at 5, information whether the target RNC is updated is preferably included in the RRC message to the ME+ (message 8 of FIG. 5), and information whether the ME is updated is preferably included in the RRC message to the target RNC (message 8') (in principle it could also be included in the source RNC to target RNC transparent container).

Next, the application of the invention to Combined cell/URA update and SRNS relocation will be described.

FIG. 7 shows the signalling that occurs upon combined cell/URA update and SRNS relocation. FIG. 7 is taken from clause 6.9.2.2.3 TS 23.060 and shows the PS version of the combined hard handover and SRNS relocation procedure. The invention only makes use of the following properties in the signalling:

there is a path to signal from the source RNC(+) to the target RNC(+) (this is the source RNC to target RNC transparent container)

there is a path to signal from the target RNC(+) to the source RNC(+) (this is the target RNC to source RNC transparent container)

the target RNC to source RNC transparent container contains a message which is delivered to the ME(+) by the target RNC(+) when received in the container. (This is the RRC message contained in the container).

For the CS case the corresponding features are used.

In the signalling shown in FIG. 7, the mobile terminal initially sends, at 1, a cell update/URA update message, or a cell update/GRA update message, to the source RNC.

In the signalling shown in FIG. 7, messages 2 to 9 correspond to messages 2 to 9 of FIG. 3 and their description will not be repeated.

At 10, the target RNC sends a cell update confirm/URA update confirm message, or a cell update confirm/GRA update confirm message, to the mobile terminal. At 10' the mobile terminal sends a UTRAN Mobility Information message to the target RNC.

In the signalling shown in FIG. 7, messages 11 to 15 correspond to messages 11 to 15 of FIG. 3 and their description will not be repeated.

As noted above, for each relocation mechanism there are two cases to consider—(A) where the source RNC is updated and (B) where the source RNC is not updated. Case A will be described first, then case B.

Case A (source RNC is updated)—Tweaking of keys—this case is very similar to the case of SRNS relocation without ME involvement described with reference to FIG. 3 up to the Relocation Detect message (message 9) (except that the intra-RNC SNRS relocation that is preferably performed before message 8 in the case of SRNS relocation without ME involvement would not be present). However from message 10 in FIG. 7, there is a significant difference compared to FIG. 3: the first message that would use the tweaked keys originates from the network side (if the same strategy was followed). The ME(+) must at this point still be ready to accept signalling from the source RNC(+), e.g., as part of some other concurrently running procedure.

The first message in the procedure, the Cell update/URA update message (message 1), is not ciphered since it is sent on the common control channel (CCCH). This message is sent by the ME(+) to the target RNC(+), which routes it to the source RNC(+) in the Uplink Signalling Transfer Indication message (not shown in FIG. 7).

According to the invention a source RNC+ knows if the ME(+) is updated or not and it tweaks the CK/IK before sending them to the target RNC(+) in the source RNC to target RNC transparent container if, and only if, the ME(+) is updated. The container is included in the Relocation required message (message 2 in FIG. 7). The target RNC(+) uses the keys in the same way as in legacy systems, and does hence not know (and does not need to know) if they have been tweaked or not.

The ME+ knows if the source RNC(+) it is connected to is an updated RNC or not, and according to the invention tweaks the CK/IK if (and only if) the source RNC(+) is updated, and this tweaking is done after sending the Cell update/URA update message (message 1). Since the Cell update/URA update message is not ciphered, and the source RNC(+) that is updated knows that the updated ME+ always tweaks the keys after sending a Cell update/URA update message, the source RNC(+) also tweaks the keys after verifying the integrity of the message. From this point on the ME+ starts accepting downlink traffic with the tweaked keys. The next downlink message from the network that the ME(+) expects to receive is the Cell update confirm/URA update confirm message from the target RNC(+) (message 10 in FIG. 7).

Case A (source RNC is updated)—Maintaining the knowledge of updated entities—according to the invention the source RNC+ sends an indication whether the ME is updated or not to the target RNC(+) in the source RNC to target RNC transparent container (this could alternatively be included in the MS capabilities IE). In this way the target RNC(+) would, if it is an updated RNC, know whether the ME(+) is updated or not.

If the target RNC(+) does not broadcast its enhanced key handling capabilities in a SIB (System Information Block), it can include an indication to the ME(+) in the Cell update confirm/URA update confirm message. A legacy target RNC would not include such an indication. In this way, if the ME(+) is an ME+ it gets to know whether the target RNC(+) is updated or not.

Case B (source RNC is not updated)—tweaking of keys—since the source RNC is not updated, no key tweaking is performed either by the ME(+) or the source RNC in this case.

Case B (source RNC is not updated)—maintaining the knowledge of updated entities—the ME(+) learns if the target RNC(+) is updated in exactly the same way as in the case that the source RNC(+) is updated.

In a case where the source RNC is a legacy RNC, it will not provide any indication to the target RNC(+) whether the ME(+) is updated or not. This means that the target RNC(+)

will not know if the ME+ is updated or not. However, an updated ME+ could include an indication that it is updated in the uplink message (UTRAN Mobility Information Confirm-message 10' in FIG. 7). Doing this means that, if the target RNC is an RNC+, the target RNC+ would be able to use key tweaking for the next SRNS relocation as it would be aware that the ME was an updated ME and so also was able to tweak the keys.

Figure 8:
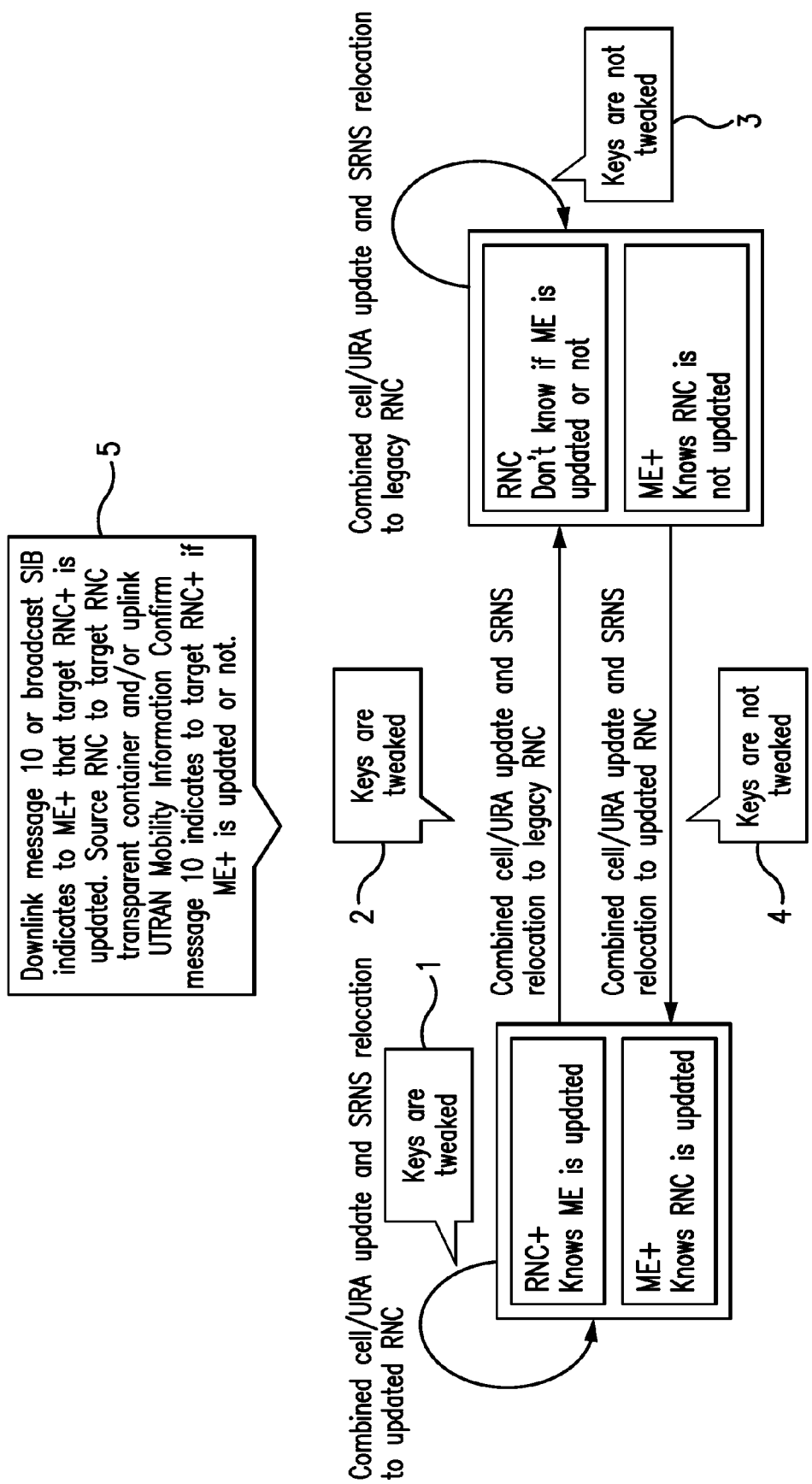
FIG. 8 illustrates the principal steps of a method according to the third embodiment.

FIG. 8 is a state chart that shows how knowledge is maintained in the RNC(+)s and the ME+ at combined cell/URA update and SRNS relocation.

The left of FIG. 8 shows the state where the ME+ is being served by an updated RNC. The ME+ knows that the RNC is updated, and the RNC+ knows that the ME is updated. If combined cell/URA update and SRNS relocation occurs to a target RNC that is updated, the keys are tweaked at 1 by both the source RNC+ and the ME+.

If combined cell/URA update and SRNS relocation occurs to a target RNC that is not updated, the keys are also tweaked both the source RNC+ and the ME+ at 2.

The right of FIG. 8 shows the state where the ME+ is being served by an RNC that is not updated. The ME+ knows that the RNC is not updated, but the source RNC does not know that the ME is updated. If combined cell/URA update and SRNS relocation occurs, the keys cannot be tweaked by the source RNC since it is not updated, and the keys are also not tweaked by the ME+ (even though the ME+ is capable of tweaking the keys) as shown at 3 and 4.

As indicated at 5, information whether the target RNC is updated is preferably included in the cell update confirm/URA update confirm (or cell update confirm/URA update) message from the target RNC+ to the ME (message 10 of FIG. 7) or in a SIB message, and information whether the ME is updated is preferably included and transmitted in the UTRAN Mobility Information confirm message from the ME+ to the target RNC(+) (message 10' of FIG. 7) or in the source RNC to target RNC transparent container.

Figure 9:
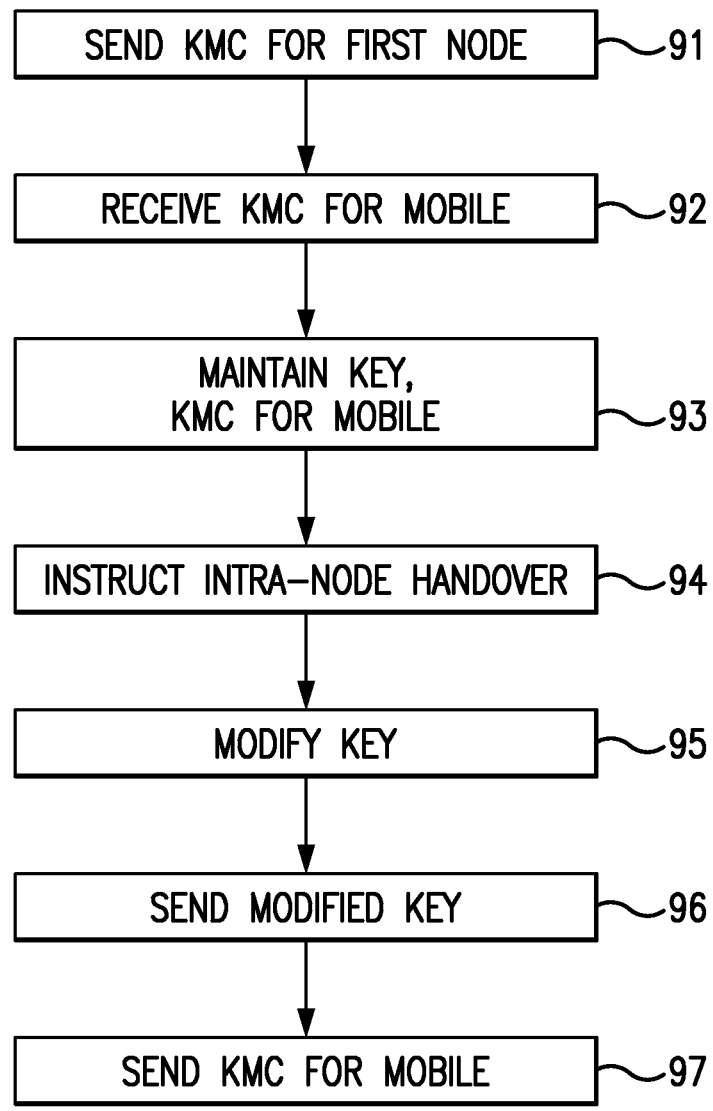
FIG. 9 is a block flow diagram showing principal steps of a method according to an embodiment of the invention.

FIG. 9 is a block flow diagram illustrating principal steps of a method of the invention.

As shown at step 93 the node, for example a source RNC serving a mobile terminal over a connection protected by at least one first key maintains the first key(s) and information about the key management capabilities (KMC) of the mobile terminal. If the mobile terminal undergoes SRNS relocation to a new RNC, at step 95 the node will modify the first key(s) to create second key(s) if, and only if, the stored key management capabilities indicate that the mobile terminal supports an enhanced key management capability. The node then sends the second key(s) to the new RNC (ie to the target RNC), at step 96. (If the stored said key management capabilities indicate that the mobile terminal does not support an enhanced key management capability, ie that the mobile terminal is a legacy mobile terminal, the node will not carry out step 95, and the node will send the first key(s), unmodified, at step 96.)

At step 97, information about the key management capabilities of the mobile terminal is transmitted to the target RNC. This information may be sent by the node (ie by the source RNC) or by the mobile terminal.

As noted if the SNRS relocation is SRNS relocation without ME involvement, the source RNC may instruct the mobile terminal to perform an intra-node relocation before modifying the first key(s), and this is shown as step 94 in FIG. 9.

Steps 91 and 92 of FIG. 9 illustrate possible steps that occur when the node becomes the RNC serving the mobile terminal, by SNRS relocation from a third node (which acts as the source node for this relocation). At step 91 the node may send, to the mobile terminal, information about the key management capabilities of the node—so that the mobile terminal is made aware that it is being relocated to an RNC that is an updated RNC (since a legacy RNC would not send this information). At step 92 the node may receive information about the key management capabilities of the mobile terminal—this may be transmitted by either the mobile terminal or by the third node.

As explained previously, steps 96 and 97, and steps 91 and 92 if performed, may make use of signalling messages relating to the SNRS relocation, to avoid the need for additional messages.

Figure 10:
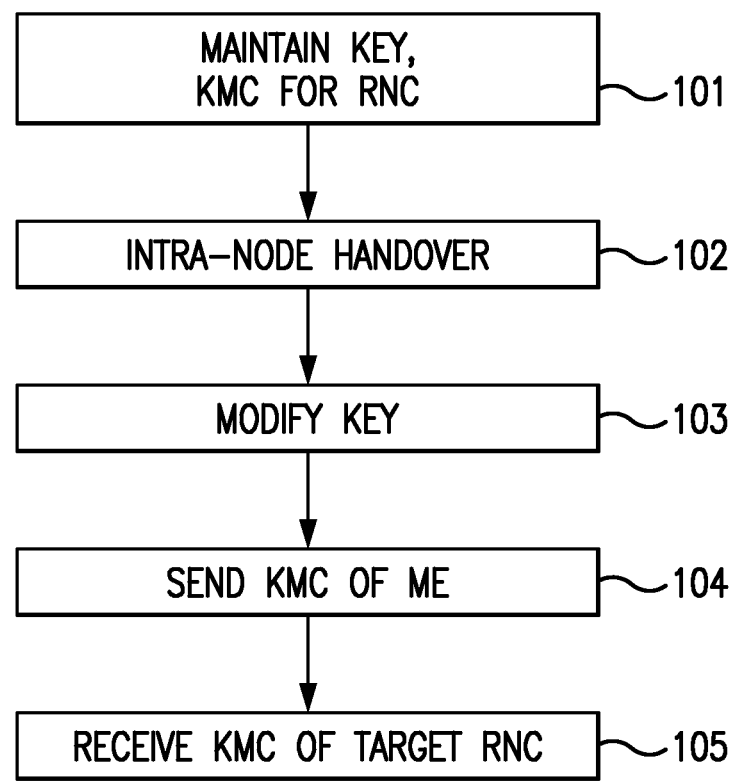
FIG. 10 is a block flow diagram showing principal steps of a method according to another embodiment of the invention.

FIG. 10 is a block flow diagram illustrating principal steps of a method of the invention as carried out at a mobile terminal.

The mobile terminal, which is served by a source RNC over a connection protected by at least one first key, maintains the first key(s). At step 101 the mobile terminal maintains the first key(s) and information about the key management capabilities (KMC) of the source RNC. If the mobile terminal undergoes SRNS relocation to a new RNC, at step 103 the mobile terminal will modify the first key(s) to create second key(s) if, and only if, the stored key management capabilities indicate that the source RNC supports an enhanced key management capability. (If the stored said key management capabilities indicate that the source RNC does not support an enhanced key management capability, ie that the source RNC is a legacy RNC, the mobile terminal will not carry out step 103.)

As noted above, if the SNRS relocation is SRNS relocation without ME involvement, the source RNC may instruct the mobile terminal to perform an intra-node relocation before modifying the first key(s). Performance of the intra-node relocation is shown as step 102 in FIG. 10.

At step 104, the mobile terminal may transmit information about the key management capabilities of the mobile terminal to the RNC that is the target RNC in the SNRS relocation. After the relocation, the mobile terminal receives at step 105 information about key management capabilities of the RNC that is the target RNC in the SNRS relocation (assuming that the target RNC is an updated RNC—if the target RNC is a legacy RNC the mobile terminal will not receive information about key management capabilities of the RNC, and will know from the non-receipt of this information that it is now being served by a legacy RNC).

Figure 11:
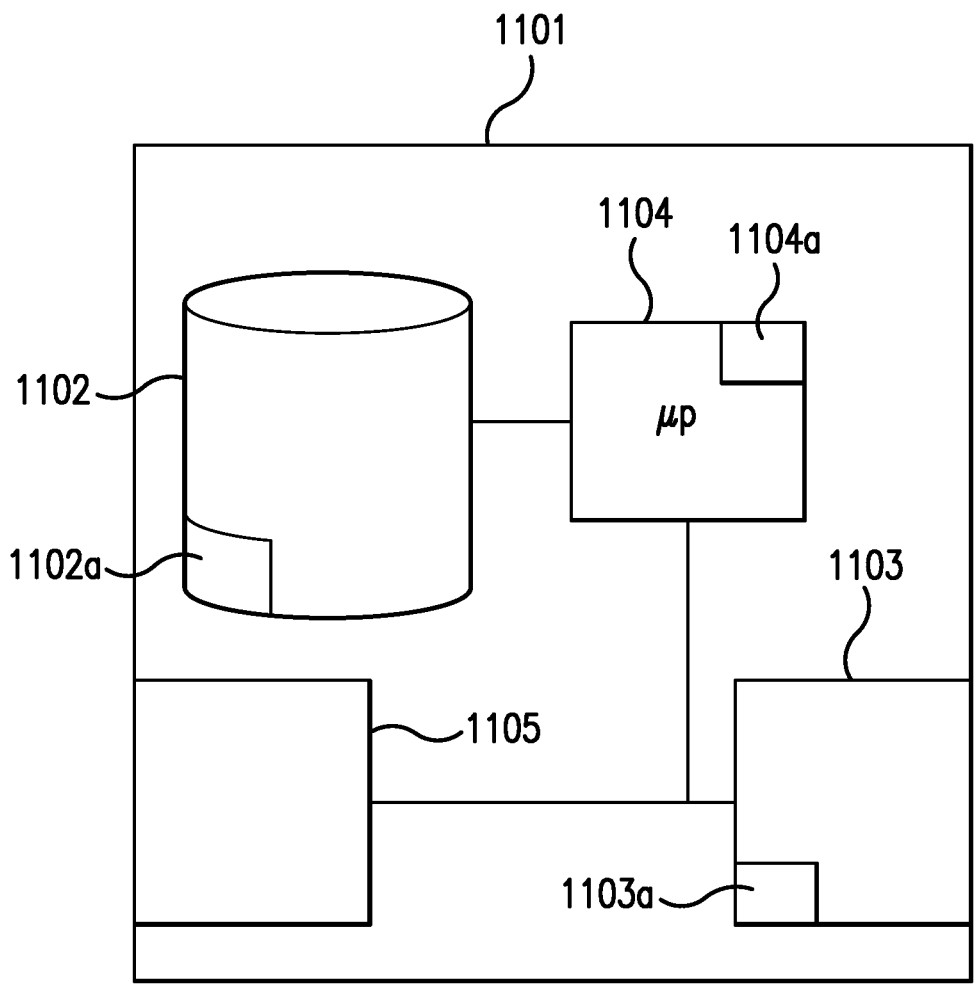
FIG. 11 is a block diagram showing principal components of a node according to an embodiment of the invention.

FIG. 11 is a block diagram showing principal components of a node 1101 according to an embodiment of the invention. The node has an input interface 1105 and an output interface 1103, a processor 1104 and a memory 1102. These components are, or may be, conventional, and will not be described further.

The node 1101 further has a module 1102*a* for maintaining information about the key management capabilities of a mobile terminal being served by the node over a connection protected by at least one first key, and for maintaining the first key. The module 1102*a* may be part of the memory 1102 of the node as shown in FIG. 11, or the module 1102*a* may be separate from the memory 1102 of the node.

The node 1101 further has a module 1104*a* for, upon relocation of the mobile terminal to a second node, modifying the first key to create a second key if, and only if, the key management capabilities for the mobile terminal as stored in module 1102*a* indicate that the mobile terminal supports an enhanced key management capability. The module 1104*a* may be a software module that runs on the processor 1104 as indicated in FIG. 11, or alternatively the module 1104*a* may be a hardware module (including software) separate from the processor 1104.

The node 1101 further has a module 1103a for sending the second key to the second node. The module 1103a may be part of the output interface 1103 of the node as shown in FIG. 11, or the module 1103a may be separate from the output interface 1103 of the node.

The node may optionally also include a module for transmitting the key management capabilities of the mobile terminal to the second node.

Figure 12:
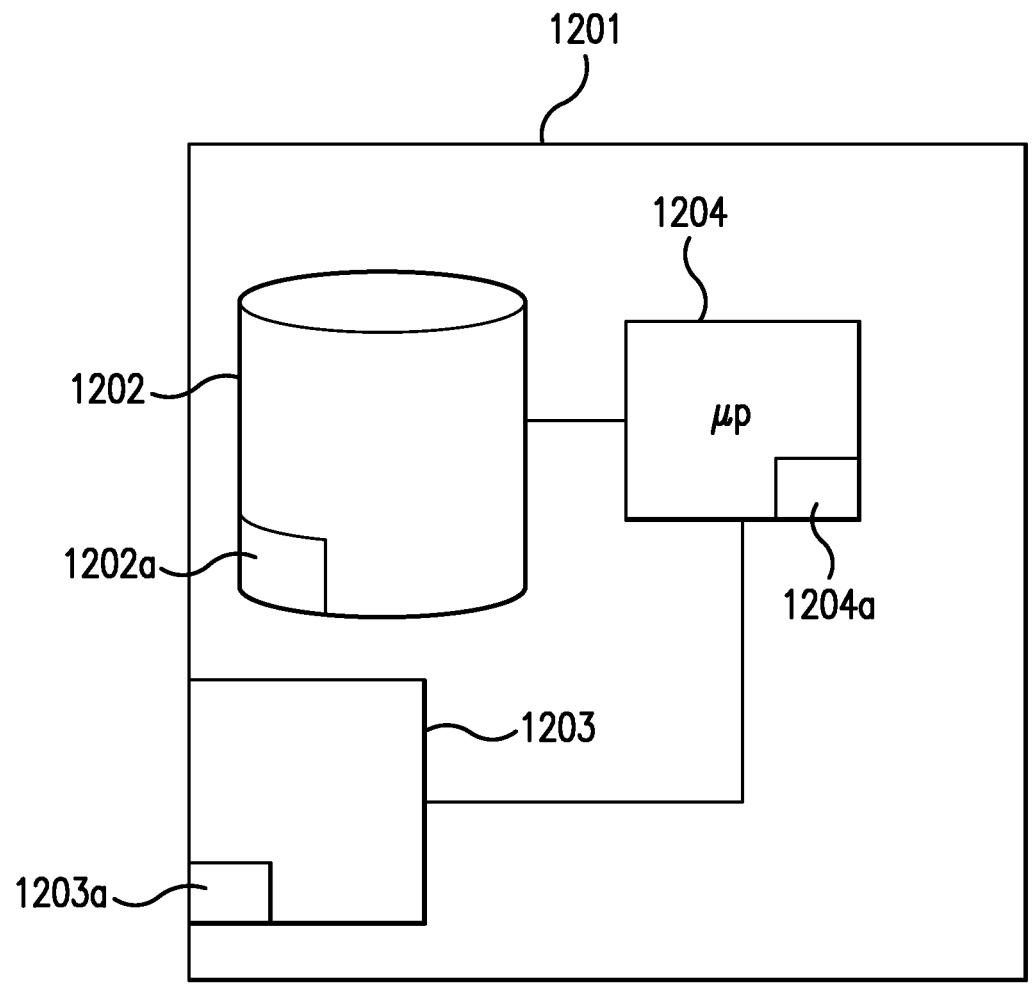
FIG. 12 is a block diagram showing principal components of a mobile terminal according to an embodiment of the invention.

FIG. 12 is a block diagram showing principal components of a mobile terminal 1201 according to an embodiment of the invention. The mobile terminal has a wireless interface 1204, a processor 1204 and a memory 1202. Other components such as a display and a data entry device such as a keyboard (or a component such as a touchscreen that acts as both a display and a data entry device) are omitted for clarity.

The mobile terminal 1201 further has a module 1202a for maintaining information about the key management capabilities of a first node serving the mobile terminal over a connection protected by at least one first key, and for maintaining the first key. The module 1202a may be part of the memory 1202 of the mobile terminal as shown in FIG. 12, or the module 1202a may be separate from the memory 1202.

The mobile terminal 1201 further has a module 1204a for, upon relocation of the mobile terminal from the first node to a second node, modifying the first key to create a second key if, and only if, the key management capabilities for the first node as stored in module 1202a indicate that the first node supports an enhanced key management capability. The module 1204a may be a software module that runs on the processor 1204 as indicated in FIG. 12, or alternatively the module 1204a may be a hardware module (including software) separate from the processor 1204.

The mobile terminal 1201 may optionally further have a module 1203a for transmitting its key management capabilities to the second node. The module 1203a may be part of the wireless interface 1203 of the node as shown in FIG. 12, or the module 1203a may be separate from the wireless interface 1203 of the mobile terminal 1201.

The invention claimed is:

1. A method comprising:
maintaining, in a first node serving a mobile terminal over a connection protected using at least a first key, said first key and key management capability information about key management capabilities of the mobile terminal;
determining whether to send a second key derived from the first key to a second node as part of a procedure for relocating the mobile terminal to the second node, wherein said determining comprises determining whether the key management capability information indicates that the mobile terminal supports an enhanced key management capability; and
as a result of determining that the key management capability information indicates that the mobile terminal supports the enhanced key management capability, performing a mobile terminal relocation procedure that comprises the step of sending, from the first node to the second node, the second key;
receiving at the first node, after relocation of the mobile terminal from a third node to the first node, information from the mobile terminal about the key management capabilities of the mobile terminal; and
including the information about the key management capabilities of the mobile terminal in one or more signaling messages relating to completion of the relocation of the mobile terminal from the third node to the first node.

2. The method of claim 1, further comprising,
prior to said first node modifying said first key, said first node instructing said mobile terminal to perform an intra-node relocation to said first node.

3. The method of claim 1, further comprising transmitting to the second node the information about the key management capabilities of the mobile terminal, wherein the transmitting step is performed by the mobile terminal or the first node.

4. The method of claim 2, further comprising transmitting the information about the key management capabilities of the mobile terminal in one or more signaling messages relating to completion of the relocation.

5. The method of claim 1, further comprising determining at a relocation preparation phase, based on the information about the key management capabilities of the mobile terminal, whether the enhanced key management capability is supported by the mobile terminal.

6. The method of claim 1, wherein modifying the first key comprises modifying the first key using the first key and information relating to the second node.

7. The method of claim 1, further comprising, upon relocation of the mobile terminal from a said third node to the first node, sending, from the first node to the mobile terminal, information about the key management capabilities of the first node.

8. The method of claim 7, wherein the information about the key management capabilities of the first node comprises information that the first node supports an enhanced key management capability.

9. A first node for serving a mobile terminal, the first node comprising:
a data storage system storing information about the key management capabilities of a mobile terminal being served by the first node over a connection protected by at least one first key, and storing said first key;
a transmitter;
a receiver for receiving at the first node, after relocation of the mobile terminal from a third node to the first node, information from the mobile terminal about the key management capabilities of the mobile terminal; and
a processor coupled to the data storage system and the transmitter, wherein the processor is configured to:
determine whether said information about the key management capabilities indicate that the mobile terminal supports an enhanced key management capability,
create a second key using the first key, and
upon relocation of the mobile terminal to a second node, employ the transmitter to send the second key to the second node as a result of determining that said information about the key management capabilities indicate that the mobile terminal supports said enhanced key management capability, and
include the information about the key management capabilities of the mobile terminal in one or more signaling messages relating to completion of the relocation of the mobile terminal from the third node to the first node.

10. The first node of claim 9, wherein the processor is further configured to employ the transmitter to send to the second node the information about the key management capabilities of the mobile terminal.

11. A mobile terminal comprising:
a data storage system storing information about the key management capabilities of a first node serving the mobile terminal over a connection protected using at least one first key, and storing the first key;
a transmitter; and
a processor coupled to the transmitter and the data storage system, wherein the processor is configured to:

determine whether said information about the key management capabilities of a of the first node indicate that the first node supports an enhanced key management capability, and generate a second key using the first key as a result of determining that said information about the key management capabilities of the first node indicates that the first node supports the enhanced key management capability, and after relocation of the mobile terminal from a third node to the first node, employ the transmitter to transmit to the first node information from the mobile terminal about the key management capabilities of the mobile terminal, wherein the first node is configured to include the information about the key management capabilities of the mobile terminal in one or more signaling messages relating to completion of the relocation of the mobile terminal from the third node to the first node.

12. The mobile terminal of claim 11, wherein the processor is further configured to employ the transmitter to send to one or more of the first node and the second node said information about the key management capabilities of the mobile terminal.

13. A method in a mobile terminal, the method comprising:
storing, in a data storage system of the mobile terminal, information about the key management capabilities of a first node serving the mobile terminal over a connection protected using at least one first key, and storing the first key, wherein the mobile terminal includes a transmitter and a processor coupled to the transmitter and the data storage system, and the method further comprises the processor performing the following steps:

determining whether said information about the key management capabilities of the first node indicate that the first node supports an enhanced key management capability, generating a second key using the first key as a result of determining that said information about the key management capabilities of the first node indicates that the first node supports the enhanced key management capability, and after relocation of the mobile terminal from a third node to the first node, employing the transmitter to transmit to the first node information about the key management capabilities of the mobile terminal, wherein the first node is configured to include the information about the key management capabilities of the mobile terminal in one or more signalling messages relating to completion of the relocation of the mobile terminal from the third node to the first node.

14. The method of claim 13, further comprising,
prior to said mobile terminal modifying said first key, said mobile terminal performing an intra-node relocation.

15. The method of claim 13, further comprising sending, from the mobile terminal to one or more of the first node and the second node, information about the key management capabilities of the mobile terminal.

16. The method of claim 13, further comprising receiving at the mobile terminal, after the relocation of the mobile terminal to the second node, information about key management capabilities of the second node.

17. The method of claim 15, further comprising including the information about the key management capabilities of the mobile terminal in one or more signalling messages relating to completion of the relocation.

18. The method of claim 13, wherein modifying the first key comprises modifying the first key using the first key and information relating to the second node.

19. A computer program product comprising a non-transitory computer readable medium storing computer readable code that, when run on a processor in a mobile terminal comprising a transmitter, causes the mobile terminal to perform a method comprising:

storing, in a data storage system of the mobile terminal, information about the key management capabilities of a first node serving the mobile terminal over a connection protected using at least one first key, and storing the first key;

determining whether said information about the key management capabilities of the first node indicate that the first node supports an enhanced key management capability;

generating a second key using the first key as a result of determining that said information about the key management capabilities of the first node indicates that the first node supports the enhanced key management capability; and after relocation of the mobile terminal from a third node to the first node, employing the transmitter to transmit to the first node information about the key management capabilities of the mobile terminal, wherein the first node is configured to include the information about the key management capabilities of the mobile terminal in one or more signalling messages relating to completion of the relocation of the mobile terminal from the third node to the first node.

* * * * *